United States Patent
Kawano

(10) Patent No.: US 6,897,983 B1
(45) Date of Patent: May 24, 2005

(54) IMAGE PROCESSOR

(75) Inventor: Hiroshi Kawano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/550,391

(22) Filed: Apr. 14, 2000

(30) Foreign Application Priority Data

Apr. 16, 1999 (JP) .......................................... 11-110009

(51) Int. Cl.⁷ .......................... H04N 1/409; H04N 1/58; G06T 5/00
(52) U.S. Cl. ...................... 358/3.26; 358/533; 382/260; 382/275
(58) Field of Search ................................. 358/2.1, 3.26, 358/533, 520, 463; 348/663, 667, 666; 382/275, 162, 167, 260, 261, 263, 264

(56) References Cited

U.S. PATENT DOCUMENTS

| | | | | |
|---|---|---|---|---|
| 5,200,840 A | * | 4/1993 | Koike et al. ................. | 358/453 |
| 5,231,479 A | * | 7/1993 | Owashi et al. ............... | 348/667 |
| 5,410,619 A | | 4/1995 | Fujisawa et al. ............. | 382/254 |

FOREIGN PATENT DOCUMENTS

| | | | | |
|---|---|---|---|---|
| JP | 57-24168 | 2/1982 | | |
| JP | 3-30574 | 2/1991 | | |
| JP | 4104576 | 4/1992 | ............ | H04N/1/40 |
| JP | 5145759 | 3/1993 | ............ | H04N/1/40 |
| JP | 05344345 | 12/1993 | | |
| JP | 07220072 | 8/1995 | ............ | G06T/5/20 |
| JP | 10028225 | 1/1998 | ........... | H04N/1/409 |

OTHER PUBLICATIONS

Notification of Reason for Refusal Issued Aug. 10, 2004 in connection with Japanese Patent Application No. 11-110009.

* cited by examiner

Primary Examiner—Scott A. Rogers
(74) Attorney, Agent, or Firm—Renner, Otto, Boisselle & Sklar, LLP

(57) ABSTRACT

An image processor of the invention has an object to provide an effective moire suppression by using a spatial filter and an efficient edge emphasis by using a spatial filter. When a spatial filter process is performed for moire removal, a spatial filter processing section of the image processor has a characteristic wherein the MTF presents values of not more than 1.0 for the entirety of the spatial frequencies to be contained in an image, and the minimum value for a moire-causative spatial frequency. This permits the image processor to prevent the quality degradation of the spatially filtered image. When a spatial filter process is performed for edge emphasis, a spatial filter processing section has a characteristic wherein the MTF is flat in an erroneous-judgment frequency band liable to cause an edge extraction error, and exceeds 1.0 at spatial frequencies below a lower limit of the erroneous-judgment frequency band. This permits the image processor to prevent the quality degradation of the spatially filtered image.

11 Claims, 32 Drawing Sheets

F I G. 9
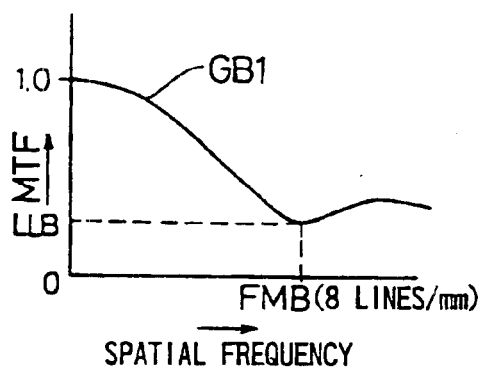
F I G. 10
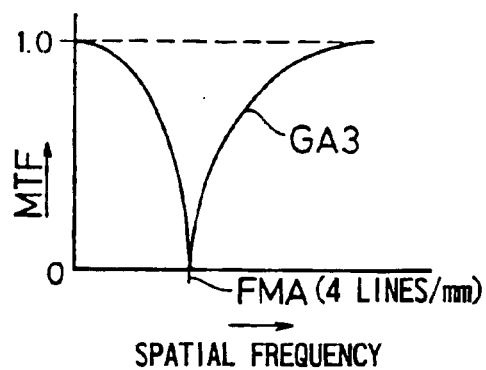
F I G. 11
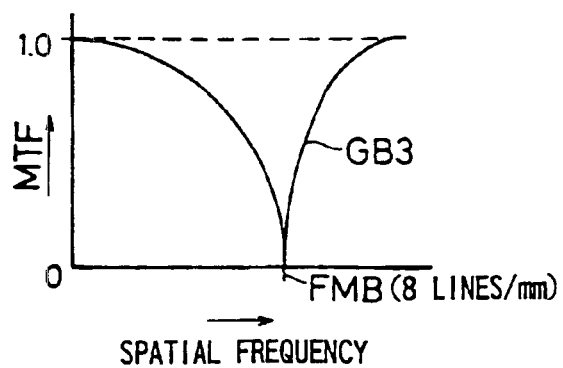

FIG.19

FIG. 21

F I G. 29B
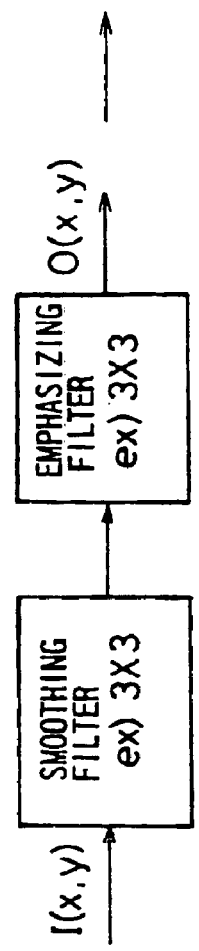
F I G. 29A

FIG. 30

F I G. 35
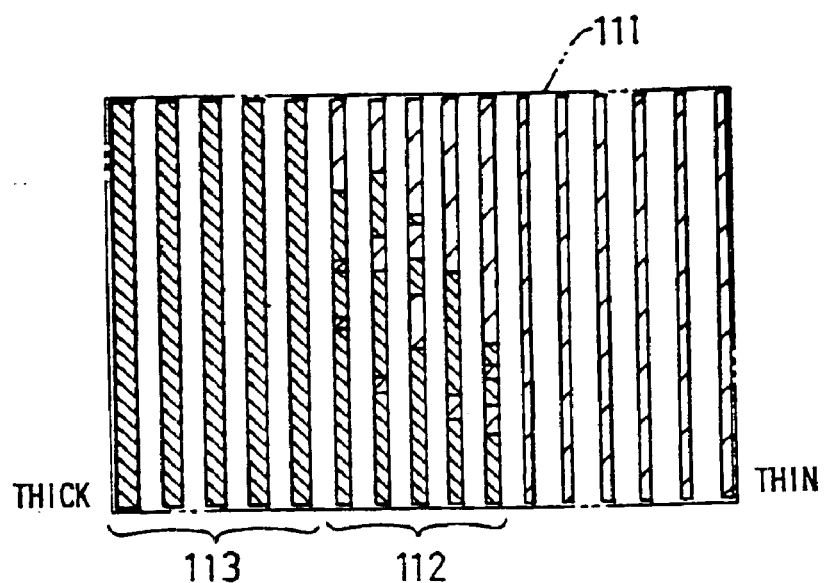
THICK                                                  THIN
      113      112
F I G. 36
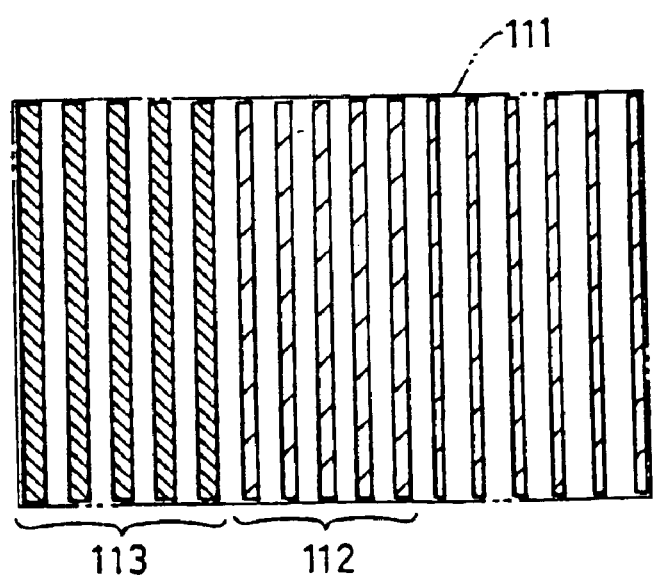
113    112

FIG. 41 PRIOR ART
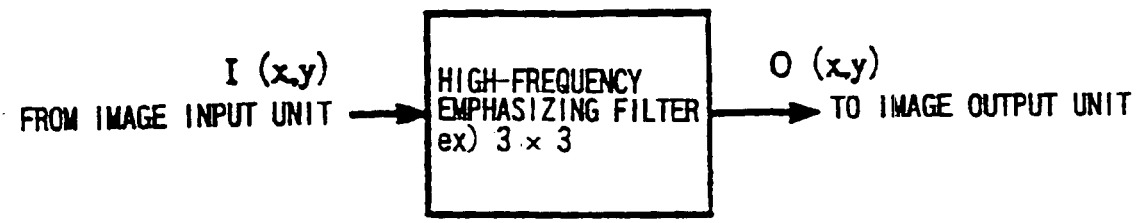
FIG. 42 PRIOR ART
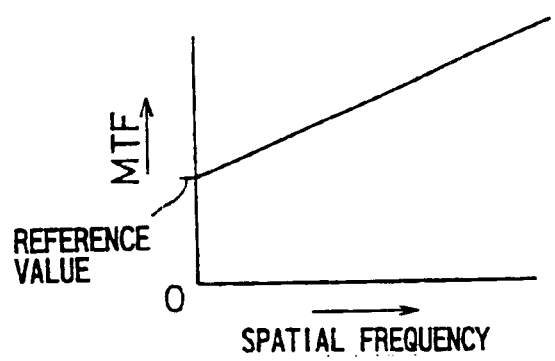
FIG. 43 PRIOR ART
| 0 | -2 | 0 |
|---|----|---|
| -2 | 1.8 | -2 |
| 0 | -2 | 0 |

IMAGE PROCESSOR

BACKGROUND OF THE INVENTION

1. Field of the Invention

The present invention relates to an image processor which performs image processing operations using a spatial filter.

2. Description of the Related Art

The prior-art image forming apparatus includes an image input unit embodied in a scanner, an image processor with a spatial filter and an image output unit. The image input unit reads an image to generate image data. The image processor processes the image data for improving the image quality, using the spatial filter. The image output unit outputs an image based on the processed image data. One of the image processings using the spatial filter is removal of moire produced in a dotted image. Another image processing using the spatial filter is emphasis of edges present in the image.

The moire removal is effected by a smoothing process using a smoothing filter, one type of the spatial filters. The moire pattern results from interference between periodic density variations in a density pattern of a dotted image and periodic density variations in a density pattern of an output image based on the halftone representation method. Since there are plural types of dots of different scanning densities, the moire-causative spatial frequency varies depending upon the dot types. Where a single image (original) includes plural types of dots, or where each image contains a different type of dot, it is quite difficult for a single spatial filter to exclusively attenuate individual moire-causative spatial frequency components of the image data. If the smoothing filter has such a strong attenuation characteristic for the overall frequency band as to cope with the plural types of dots, the smoothing filter attenuates not only the moire-causative spatial frequency components but also spatial frequency components which should not be involved in the moire removal.

The prior-art technique for removing moire due to the interference of the periodic density variations in density a pattern has been disclosed in Japanese Unexamined Patent Publications JP-A 4-104576 (1992) and JP-A 7-220072 (1995). An image reader of JP-A 4-104576 includes a low-pass filter with variable cut-off frequencies which is disposed rearwardly of an image-pickup unit in the image reader. The cut-off frequency of the low-pass filter is shifted according to the resolution of the image reader or the type of original to be read by the image reader.

The image processor of JP-A 7-220072 includes a plurality of band-banded cut filters with different cut-off frequencies so that the smoothing filter for removing moire fringes is selectively embodied by combining more than one of the cut filters. The image processor applies 1-D Fourier transform to input image data acquired by reading the original, and uses the results of the Fourier transform to determine a screen angle between a direction of a dot array on the original and an original reading direction, as well as the dot type. Then, the image processor selectively invokes a smoothing filter capable of removing the moire fringes resulting from the type of dots and the screen angle thus determined so as to subject the input image data to the smoothing process using the smoothing filter.

A high-frequency emphasizing filter shown in FIG. 41 may be employed as the edge-emphasizing spatial filter. As shown in FIG. 42, the high-frequency emphasizing filter has a characteristic wherein MTF (modulation transfer function) linearly increases from a predetermined reference value. A graphic representation of a characteristic curve of the high-frequency emphasizing filter is resemblant to that of direct proportion function. Where the high-frequency emphasizing filter is embodied in a 3×3 digital filter, a characteristic of a high-frequency spatial filter is defined by a matrix shown in FIG. 43. In the matrix of FIG. 43, a filter coefficient at the center is of a greater value than the other filter coefficients while difference between the central filter coefficient and the non-central coefficient decreases with increase in the distance between the central filter coefficient and the non-central coefficient.

The edge emphasizing process using the spatial filter is applied only to an image data portion corresponding to an edge. Accordingly, the image processor further includes an edge extraction section for extracting an edge in the image.

The precision of the edge extraction section depends upon an input precision of the image input unit. Where the image input unit has an input resolution of 600 dpi (dot per inch), for example, it is difficult for the edge extraction section to extract a line edge of less than 600 dpi. If this edge extraction section is used to extract an edge of a fine density pattern of high spatial frequencies above a predetermined reference value, no edge is extracted. Where the image contains a density pattern of spatial frequencies below the input resolution, the image input unit detrimentally adds to the image data noise components causing color shift or color turbidity of the image. As a result, it is difficult for the edge extraction section to separate the overall spatial frequency band of the image into a sub-band exclusively containing density-pattern spatial frequencies permitting the edge extraction and a sub-band exclusively containing density-pattern spatial frequencies not permitting the edge extraction, by determining a given spatial frequency as boundary therebetween. Where the image contains a density pattern of spatial frequencies at and about the boundary, the edge extraction section may fail to extract an edge of the density pattern.

Where the image processor performs the edge emphasizing process based on the extraction output from the edge extraction section, the density pattern of the spatial frequencies of the boundary between these sub-bands and its neighborhood may be partly emphasized or unemphasized. This results in density variations of a density-pattern area in the image so that an image outputted based on the image data through the edge emphasizing process is degraded in quality.

Japanese Unexamined Patent Publications JP-A 5-145759 (1993), 5-344345 (1993), 10-28225 (1998) disclose edge emphasizing processes using spatial filters, respectively. The image processor of JP-A 5-145759 is provided with edge-amount sensing means for sensing an amount of edge in an image, an edge emphasizing filter and a mixer for the purpose of edge emphasis. The mixer mixes together image data before and after the processing of the edge emphasizing filter at a mixing ratio based on the edge amount sensed by the edge-amount sensing means.

An apparatus employing the image processing method of JP-A 5-344345 performs the following operations prior to the edge-emphasizing filter process: segmenting a subject image into plural blocks; determining a filter strength for each of the blocks; and correcting the respective filter strengths for the blocks so as to prevent the filter strengths for adjacent two blocks from differing too much each other. After the filter strength correction, the filter of the apparatus using this image processing method filters the respective blocks based on the respective filter strengths thus corrected.

The MTF correction unit of JP-A 10-28225 is provided with the smoothing filter, edge emphasizing filter and filter performing no processing for the purpose of edge emphasis. Prior to the filter process, the MTF correction unit determines each of the all pixels constituting a subject image for the edge sharpness and coarseness, values indicative of the image quality, and then selects any one of the three filters by comparing the edge sharpness or the coarseness with a predetermined reference value. After the filter selection, all the pixels are each subjected to the edge emphasizing process using any selected one of the filters.

As mentioned above, in the image reader of JP-A 4-104576, the moire-removing low-pass filter defines the cutoff frequency according to the reading resolution. The spatial frequencies of dots in the subject image are not constant, varying depending upon the dot types. Therefore, if the cutoff frequency of the smoothing filter is shifted based on the reading resolution alone, the filter accomplishes such a poor moire removal effect, failing to provide a favorable smoothing filter process. Additionally, the low-pass filter attenuates spatial frequency components above the cutoff frequency, thus resulting in the attenuation of not only the moire-causative spatial frequencies but also spatial frequency components necessary for maintaining the output image quality. Hence, the quality degradation of reproduced images results.

In the image processor of JP-A 7-220072, the smoothing filter responsible for the smoothing process for moire removal is embodied in the combination of more than one band-cut filters of narrow bands. This results in the attenuation of only the components of the cutoff frequency of the band-cut filter and of its neighborhood. Accordingly, the moire appearance due to the remainder spatial frequencies is not prevented. Hence, the quality of a processed image is degraded because uniform moire suppression is not established for the entirety of the spatial frequencies of the processed image.

As mentioned above, the image processor of JP-A 5-145759 need to perform the sensing of the edge amount and the image data mixing in addition to the edge-emphasizing filter process. This complicates the operations done by the image processor as a whole and hence, the processor has a complicated configuration. Prior to the filter process, the apparatus using the image processing method of JP-A 5-344345 need to perform the operations of determining the filter strength for each block, detecting a boundary plane, and correcting the filter strength for the boundary plane. Thus, such an apparatus must be involved in complicated operations. The MTF correction unit of JP-A 10-28225 need to perform the calculation of the edge sharpness and coarseness as well as the selection from the three filters. This complicates the operations done by the unit as a whole and hence, the unit has a complicated configuration. In addition, the MTF correction unit selectively switches between the smoothing filter and the edge emphasizing filter based on the reference values and therefore, density variations may occur in a portion consisting of pixels with the values of edge sharpness and coarseness close to the reference values.

SUMMARY OF THE INVENTION

An object of the invention is to provide an image processor which is capable of effectively suppressing moire appearance and an image processor which provides a simple edge emphasizing process for effectively emphasizing edges.

In a first aspect of the invention, an image processor comprises:

dot-area extraction means for extracting a dot area in an image based on image data of a subject image; and moire-removing spatial filter means for performing a process of limiting spatial frequency components of the extracted dot area to an image data portion corresponding to the dot area, wherein the moire-removing spatial filter means has a characteristic of attenuating an entirety of the spatial frequency components to be contained in the image and further attenuating or removing a predetermined spatial frequency component liable to cause moire appearance.

According to the image processor of the invention, the moire-removing spatial filter means is adapted to perform a particularly effective smoothing process to the moire-causative spatial frequency component as well as a moderate soothing process to the other spatial frequency components than the moire-causative frequency component. Thus, the spatial filter means provides minimum moire-removal attenuation of the spatial frequency components while reducing the moire causative factor across the spatial frequencies to be contained in the image. Hence, the image processor of the first aspect hereof provides greater improvement in the quality of spatially filtered image than the prior-art unit for moire removal.

In a second aspect of the invention, the image processor is characterized in that the characteristic of the moire-removing spatial filter means is defined by a matrix given by a convolution operation of a matrix defining a characteristic of a first filter for attenuating or removing the moire-causative spatial frequency component and a matrix defining a smoothing filter characteristic, and the smoothing filter characteristic is to smooth the entirety of the spatial frequency components to be contained in the image.

According to the invention, the characteristic of the moire-removing spatial filter means of the image processor is defined by a single matrix so that the moire-removing spatial filter means may be embodied in a single digital filter. This contributes to an increased processing speed of the moire-removing spatial filter means and to a simplified circuit configuration thereof.

In a third aspect of the invention, the image processor is characterized in that the first filter is a band-cut filter, a spatial frequency characteristic of which presents a minimum value at the moire-causative spatial frequency.

According to the image processor of the invention, the first filter is preferably embodied in the band-cut filter. This permits the moire-removing spatial filter means to accomplish effective attenuation of the moire-causative spatial frequency component thereby ensuring an even more effective reduction of the moire causative factor. Accordingly, the image processor of the third aspect hereof provides greater improvement in the quality of spatially filtered image than the prior-art unit for moire removal.

In a fourth aspect of the invention, the image processor is characterized in that all filter coefficients of the matrix defining the smoothing filter characteristic are of an equal value.

According to the image processor of the invention, the matrix defining the smoothing filter characteristic is preferably embodied in the matrix in which all the filter coefficients are of the equal value. This imparts the moire-removing spatial filter means with the characteristic of attenuating the entirety of the spatial frequency components to be contained in the image.

In a fifth aspect of the invention, the image processor is characterized in that out of all the filter coefficients of the matrix defining the smoothing filter characteristic, a central coefficient of the matrix has a greater value than the other coefficients.

According to the image processor of the invention, the matrix defining the smoothing filter characteristic is more preferably embodied in the matrix wherein the central filter coefficient has a greater value than the others. This imparts the moire-removing spatial filter means with the characteristic of attenuating the entirety of the spatial frequency components to be contained in the image.

In a sixth aspect of the invention, the image processor is characterized in that in the case where a plurality of moire-causative spatial frequencies are previously determined, the matrix defining the first filter characteristic is given by a cross convolution operation of matrices respectively defining characteristics of respective filters for attenuating or removing the respective moire-causative spatial frequency components.

According to the invention, where a plurality of moire-causative spatial frequencies are determined, the matrix defining the first filter characteristic is obtained by the cross convolution operation of the matrices each defining the characteristic of each filter for attenuating or removing each moire-causative spatial frequency component. Thus, the spatial filter means for favorably removing moire from the dot area is readily obtained.

In a seventh aspect of the invention, the image processor is characterized in that in the case where the image is composed of pixels and image data thereof is composed of luminance data and color difference data on each of the pixels, the moire-removing spatial filter means processes only the luminance data on each pixel.

According to the invention, where the image data is composed of the luminance data and color difference data on each of the pixels, it is preferred for the moire-removing spatial filter means of the image processor to process only the pixel luminance data for the following reason.

The moire-removing spatial filter means herein convert a spatial frequency characteristics of a subject image to desired characteristics for a main purpose of improving the image quality. If the subject image with the converted spatial frequency characteristics is differently perceived in color, the image after the conversion is degraded in quality as compared with the image before the conversion. Therefore, the moire-removing spatial filter means is preferred to convert the spatial frequency characteristics of the subject image in a manner to maintain the color perception thereof as it is.

The moire-removing spatial filter means of the image processor according to the seventh aspect processes only the luminance data indicative of the degree of pixel density, performing no process to the color difference data indicative of pixel color. This prevents the change in image color. Thus, the moire-removing spatial filter means may subject the image data to a preferred process for limiting the spatial frequency components without causing the image quality degradation.

In an eighth aspect of the invention, an image processor comprises:
edge extraction means for extracting an edge in a subject image based on image data of the image; and
edge-emphasizing spatial filter means for performing an edge emphasizing process to an image data portion corresponding to the extracted edge,
wherein the edge-emphasizing spatial filter means has a characteristic which is flat in an erroneous-judgment frequency band containing spatial frequencies liable to cause an edge extraction error of the edge extraction means, and
emphasizes spatial frequency components in a spatial frequency band below a lower limit of the erroneous-judgment frequency band.

According to the invention, the edge-emphasizing spatial filter means of the image processor maintains the spatial frequency components in the erroneous-judgment frequency band as they are, while emphasizing the spatial frequency components below the lower limit of the erroneous-judgment frequency band. The erroneous-judgment frequency band is equivalent to a boundary of a density-pattern spatial frequency area permitting the edge extraction of the edge extraction means. The edge-emphasizing spatial filter means may perform a preferred edge emphasizing process to the spatial frequency components liable to cause the erroneous edge judgment. Briefly, the edge-emphasizing spatial filter means is adapted to subject the overall image to a uniform and favorable edge emphasizing process. Hence, the edge-emphasizing spatial filter means prevents the edge-emphasized image from suffering the quality degradation resulting from the edge extraction error of the edge extraction means.

In a ninth aspect of the invention, the image processor is characterized in that the characteristic of the edge-emphasizing spatial filter means is defined by a matrix given by a convolution operation of a matrix defining an emphasizing filter characteristic and a matrix defining a smoothing filter characteristic,
the smoothing filter has a characteristic of smoothing an entirety of the spatial frequency components to be contained in the image, and
the emphasizing filter has a characteristic of emphasizing the entirety of the spatial frequency components to be contained in the image.

According to the invention, the characteristic of the edge-emphasizing spatial filter mean of the image processor can be defined by a single matrix so that the edge-emphasizing spatial filter means is embodied in a single digital filter. The edge-emphasizing spatial filter means does not employ plural filters, negating the need for cumbersome operations such as to change filter coefficients according to the degree of edge emphasis. This permits the edge-emphasizing spatial filter means to easily maintain the flat characteristic in the spatial frequency band containing the spatial frequencies liable to cause the edge extraction error. At the same time, the spatial filter means is capable of readily emphasizing the edge of a density pattern of spatial frequencies excluded from the above frequency band, or more precisely of spatial frequencies below the spatial frequencies liable to cause the edge extraction error. Because of the implementation by a single digital filter, the edge-emphasizing spatial filter means is improved in the processing speed and simplified in the circuit configuration.

In a tenth aspect of the invention, the image processor is characterized in that in the case where the image is composed of pixels and where image data thereof is composed of plural color data pieces obtained through color separation of data on each pixel,
the edge-emphasizing spatial filter means respectively processes the discrete plural color data pieces on each pixel, and
characteristics of the edge-emphasizing spatial filter means in the discrete processes for the color data pieces are defined separately according to a characteristic of each of the color data pieces.

According to the invention, the edge-emphasizing spatial filter means performs the processing based on the characteristic defined for each of the color data pieces where the image data consists of plural color data pieces. This permits the edge-emphasizing spatial filter means to readily emphasize an edge of a specific color when the emphasis of the specific color edge among others is desired. Thus, the edge-emphasizing spatial filter means is adapted to perform an even more preferred edge emphasizing process to the image.

In an eleventh aspect of the invention, the image processor is characterized in that the characteristic of the edge-emphasizing spatial filter means in the discrete process for each of the color data pieces is defined by a matrix given by a convolution operation of a matrix defining an emphasizing filter characteristic and a matrix defining a smoothing filter characteristic, the smoothing filter characteristic is to smooth the entirety of the spatial frequency components to be contained in the image, the emphasizing filter characteristic used in the convolution operation for defining the characteristic of the edge-emphasizing spatial filter means in the discrete process for each of the color data pieces is to emphasize the entirety of the spatial frequency components to be contained in the image, and the emphasizing filter characteristic is defined according to the characteristic of each of the color data pieces.

According to the invention, in the edge-emphasizing spatial filter means of the image processor, the characteristic used in the discrete process for each color data piece is obtained by convoluting the matrices for defining the emphasizing filter characteristic and the smoothing filter characteristic. The emphasis degree of the filter with the characteristic defined by the matrix given by the convolution operation varies with the variation of the emphasis degree of the emphasizing filter. Accordingly, in the discrete process for each color data piece, the edge-emphasizing spatial filter means may readily be varied in the degree of emphasis by changing the emphasis degree of the emphasizing filter.

In a twelfth aspect of the invention, the image processor is characterized in that in the case where the image is composed of pixels, image data of the image is composed of plural color data pieces obtained through color separation of data on each pixel and one of the plural color data pieces is black data indicative of pixel density, the edge-emphasizing spatial filter means processes only the black data on each pixel.

According to the invention, the edge-emphasizing spatial filter means of the image processor is preferred to process only the black data on each pixel in the case where the image data consists of plural color data pieces on each pixel and one of the plural data pieces is the black data. Thus, the edge-emphasizing spatial filter means exclusively emphasizes a black edge, leaving edges of the other colors unemphasized. There is the following reason for this. Where an image to be sharpened is a character image, a black edge of the character image is thought to be effectively sharpened. Where the image to be sharpened contains a color edge, the color edge does not always belong to a color character image and may be a part of a contour of an area present in the image. Therefore, the effect of emphasizing the color edge is not always acceptable. On this account, the edge-emphasizing spatial filter means of the image processor according the twelfth aspect hereof processes only the black data indicative of the pixel density, performing no process to the other color data pieces indicative of the pixel colors. In this manner, the edge-emphasizing spatial filter means prevents the image from being changed in color, providing an even more effective edge emphasizing process. As a result, the sharpened image is further improved in image quality.

In a thirteenth aspect of the invention, the image processor is characterized in that in the case where the image is composed of pixels and image data of the image in composed of luminance data and color difference data on each pixel, the edge-emphasizing spatial filter means processes only the luminance data on each pixel.

According to the invention, the edge-emphasizing spatial filter means of the image processor is preferred to process only the luminance-data where the image data consists of the luminance data and color difference data on each pixel. The following reason is given for this. The edge-emphasizing spatial filter means converts spatial frequency characteristics of the subject image to desired characteristics for the main purpose of improving the image quality. If the image with the converted spatial frequency characteristics is differently perceived in color, the image after the conversion is degraded in quality as compared with the image before the conversion. Therefore, it is preferred for the edge-emphasizing spatial filter means to convert the spatial frequency characteristics of the subject image in a manner to maintain the color perception thereof as it is. The edge-emphasizing spatial filter means of the image processor according to the thirteenth aspect hereof processes only the luminance data indicative of pixel density, performing no process to the color difference data indicative of pixel color. In this manner, the edge-emphasizing spatial filter means prevents the image from being changed in color, providing an even more effective edge emphasizing process free from the fear of the image quality degradation.

BRIEF DESCRIPTION OF THE DRAWINGS

Other and further objects, features, and advantages of the invention will be more explicit from the following detailed description taken with reference to the drawings wherein.

FIG. 9 is a graph representing an ideal characteristic of a spatial filter processing section for 133-line dot;

FIG. 10 is a graph representing an ideal characteristic of a first filter for defining the ideal characteristic of the spatial filter processing section for 65-line dot;

FIG. 11 is a graph representing an ideal characteristic of the first filter for defining the ideal characteristic of the spatial filter processing section for 133-line dot;

FIG. 19 is a diagram showing a determinant for defining an optimum spatial filter matrix for 65-line dot using a smoothing filter matrix wherein a central filter coefficient has a greater value than the rest;

FIG. 21 is a diagram showing a determinant for defining an optimum spatial filter matrix for 133-line dot using a smoothing filter matrix wherein a central filter coefficient has a greater value than the rest;

FIGS. 29A–29B are block diagrams showing a configuration of an edge-emphasizing spatial filter processing section;

FIG. 30 is a diagram showing a determinant for defining an optimum edge-emphasizing spatial filter matrix;

FIG. 35 is a diagram showing results of the prior-art edge extraction process applied to the image of FIG. 33;

FIG. 36 is a diagram showing results of an edge w emphasizing process applied to the image of FIG. 33 according to the second embodiment hereof;

FIG. 41 is a diagram showing a high-frequency spatial filter used for the prior-art edge emphasizing process;

FIG. 42 is a graph representing a characteristic of the high-frequency spatial filter of FIG. 41; and FIG. 43 is a diagram showing a matrix for defining the characteristic of the high-frequency spatial filter of FIG. 41.

DETAILED DESCRIPTION OF THE PREFERRED EMBODIMENTS

Figure 1:
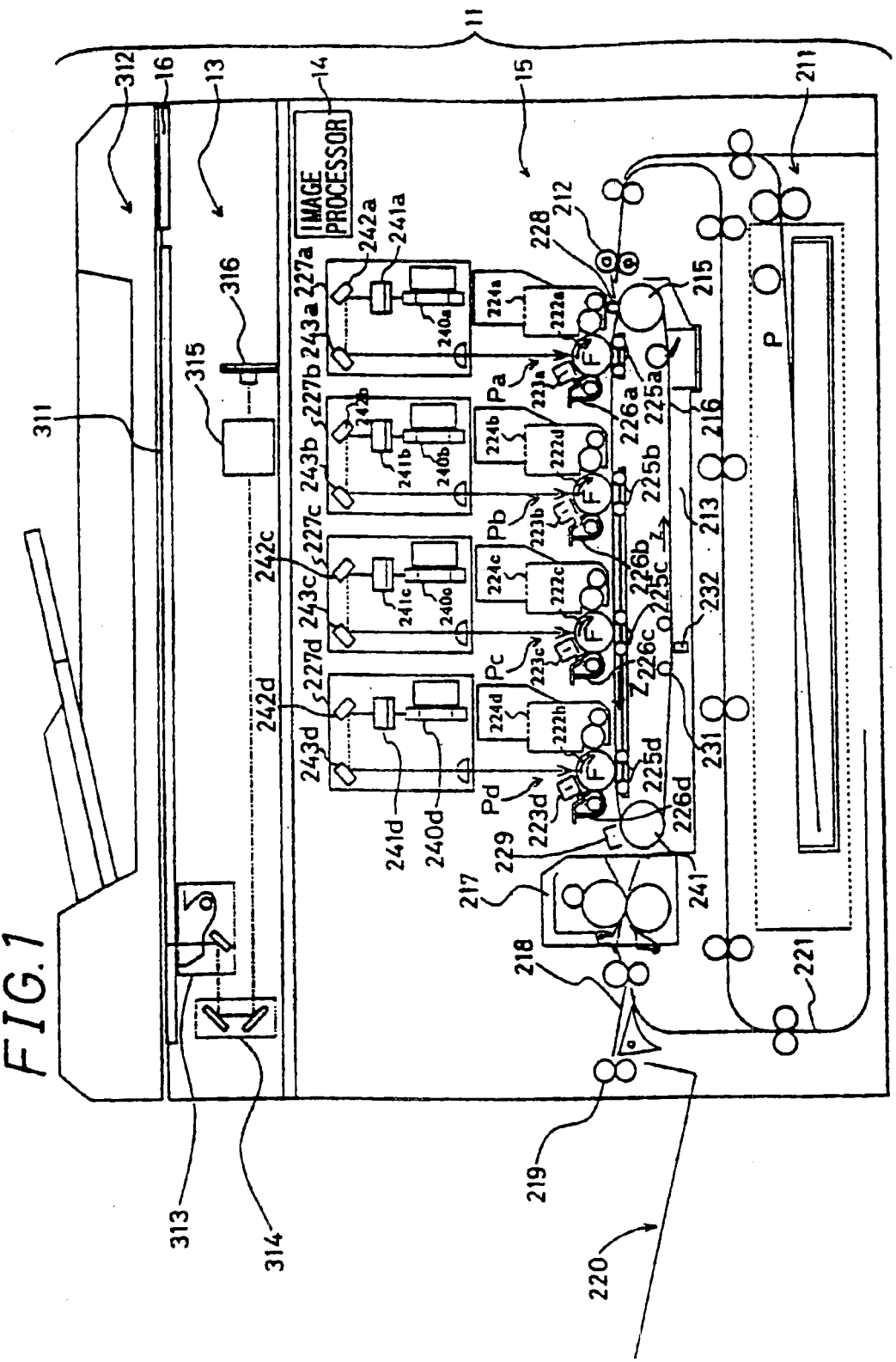
FIG. 1 is a front sectional view showing a configuration of an image forming apparatus with an image processor according to a first embodiment of the invention.

Now referring to the drawings, preferred embodiments of the invention are described below.

FIG. 1 is a front sectional view schematically showing a configuration of an image forming apparatus 11 provided with an image processor according to a first embodiment of the invention. The image forming apparatus 11 is embodied in a digital color copier. Disposed in a main body of the image forming apparatus 11 are an image input unit 13 as image input means, an image processor 14, and an image output unit 15 as image output means. A transparent document platen 311 and an operation unit 16 rest on a top surface of the main body of the image forming apparatus 11.

A reversing automatic document feeder 312 is mounted atop the document platen 311. The reversing automatic document feeder is supported in an openable relation with the document platen 311 and in a given positional relation with the surface of the document platen 311. The reversing automatic document feeder 312 first transports an original document to a predetermined position of the document platen 311 in a manner to bring one side of the original into face-to-face relation with the image input unit 13. After the one side of the original is read, the document feeder re-transports the original, as reversing it, to the predetermined position of the document platen 311 in a manner to bring the other side thereof into face-to-face relation with the image input unit 13. The document transporting and reversing operations of the reversing automatic document feeder 312 are controlled in conjunction with operations of the whole body of the image forming apparatus 11.

The image input unit 13 is disposed under the document platen 311 so as to read an image of the original delivered onto the document platen 311 by the reversing automatic document feeder 312. The image input unit 13 includes a document scanner adapted for reciprocal movement parallel to a lower surface of the document platen 311, an optical lens 315 and a CCD (charge coupled device) line sensor 316, a photoelectric converter.

The document scanner includes a first scanner unit 313 and a second scanner unit 314. The first scanner unit 313 includes a light exposure lamp for irradiating the original surface with light, and a first mirror for directing reflected light from the original to a predetermined first direction. The first scanner unit 313 reciprocates parallel to the lower surface of the document platen 313 as maintaining a predetermined distance therefrom. The second scanner unit 314 includes a second mirror and a third mirror for directing, to a predetermined second direction, the reflected light image from the first mirror of the first scanner unit 313. The second scanner unit 314 reciprocates parallel to the lower surface of the document platen 311 as maintaining a predetermined speed relation with the first scanner unit 313.

The optical lens 315 reduces the reflected light image directed thereto by the third mirror of the second scanner unit and focuses the reduced light image on a predetermined place on the CCD line sensor 316. The CCD line sensor 316 photoelectrically converts the light image thereon in sequence so as to output an analog image signal, an electric signal. Specifically, the CCD line sensor 316 of the image forming apparatus 11 is comprised of a 3-line color CCD line sensor. The 3-line color CCD line sensor reads a monochromatic or color image, separating its reflected light image into images of individual color components of red (R), green (G) and blue (B) for outputting reflectance signals respectively corresponding to the images of the three color components of red (R), green (G) and blue (B). The reflectance signal generated by the CCD line sensor 316 is supplied to the image processor 14. Hereinafter, the three colors of red, green and blue will be collectively referred to as "RGB".

The image processor 14 performs a predetermined process, which will be described later, on the RGB reflectance signal thus supplied. As a result, the RGB reflectance signal is converted to a digital image signal (hereinafter referred to as "image data") which consists of signals respectively corresponding to images of color components of cyan (C), magenta (M), yellow (Y) and black (K). Hereinafter, the four colors of cyan, magenta, yellow and black will be collectively referred to as "CMYK".

A sheet feeding mechanism 211 with a paper tray is disposed under the image output unit 15. In the image forming apparatus 11 according to the embodiment, a receiving medium in the form of a cut sheet is used as paper P. Briefly, the sheet feeding mechanism 211 feeds the paper P to the image output unit 14 as separating the paper P in the paper tray on a sheet-by-sheet basis. In the case of two-side printing, the sheet feeding mechanism 211 re-feeds the paper P with image formed on one side thereof to the image output unit 15 in timed relation with the image forming operations of the image output unit. When the paper P from the paper tray enters a guide of a sheet feed passage in the sheet feeding mechanism 211, a sensor in the sheet feed passage detects a leading edge of the paper P to output a detection signal.

A pair of registration rollers 212 are disposed upstream from the image output unit 15. The registration rollers 212 are responsive to the detection signal from the sensor in the sheet feed passage to bring the transported paper P into a temporary halt. The discretely fed paper P is delivered to the image output unit 15 in a sheet feeding timing controlled by the registration rollers 212.

In the image output unit 15, there are disposed a first image forming section Pa, a second image forming section Pb, a third image forming section Pc, a fourth image forming section Pd, a transfer belt mechanism 213 and a fixing device 217. The transfer belt mechanism 213 is located under the image output unit 15. The transfer belt mechanism 213 includes a drive roller 214, a driven roller 215 and a transfer conveyor belt 216 substantially stretched in parallel between these rollers 214, 215. A pattern image detection unit 232 is disposed in the proximity of a lower side of the transfer conveyor belt 216.

Above and close to the transfer conveyor belt 216 of the image output unit 15, the first image forming section Pa, second image forming section Pb, third image forming section Pc and fourth image forming section Pd are sequentially arranged in this order from an upstream side of the sheet feed passage. The fixing device 217 is disposed downstream of the transfer belt mechanism 213 in the sheet feed passage. A sheet-attraction charger 228 is interposed between the first image forming section Pa and the sheet feeding mechanism 211. A static eliminator 229 is disposed right above the drive roller 214 as interposed between the fourth image forming section Pd and the fixing device 217.

Briefly, the transfer belt mechanism 213 is arranged such that the transfer conveyor belt 216 conveys the paper P fed by the registration rollers 212, as electrostatically attracting the paper thereto. Specifically, the conveyor belt operates as follows. The sheet-attraction charger 228 charges a surface of the transfer conveyor belt 216, which is driven by the drive roller 214 in a direction of the arrow Z in FIG. 1. Thus, the transfer conveyor belt 216 delivers the paper P from the sheet feeding mechanism 211 sequentially to the first image forming section Pa, second image forming section Pb, third image forming section Pc and fourth image forming section Pd in this order, as carrying the paper P thereon. With the transfer conveyor belt surface 216 charged by the sheet-attraction charger 228, the transfer belt mechanism 213 can stably transport the paper P, received from the sheet feeding mechanism 211, all the way from the first image forming section Pa to the fourth image forming section Pd, as maintaining the paper P in registration as attracted to the transfer conveyor belt 216. An alternating current is applied to the sheet-separation static eliminator 229 for separating the electrostatically attracted paper P from the transfer conveyor belt 216.

The first image forming section Pa, second image forming section Pb, third image forming section Pc and fourth image forming section Pd are substantially of the same configuration. The image forming sections Pa, Pb, Pc, Pd include photoconductor drums 222a, 222b, 222c, 222d, respectively, which are rotated in a direction of the arrow F in FIG. 1. In respective peripheries of the photoconductor drums 222a–222d, a charger 223a, 223b, 223c, 223d; a developing unit 224a, 224b, 224c, 224d; a transferring member 225a, 225b, 225c, 225d; and a cleaner unit 226a, 226b, 226c, 226d are sequentially arranged in the rotation direction F of the photoconductor drums 222a–222d.

Laser-beam scanner units 227a, 227b, 227c, 227d are disposed at respective places above the photoconductor drums 222a–222d. The laser-beam scanner units 227a–227d respectively include a semiconductor laser device; a polygonal mirror as a deflecting device 240a, 240b, 240c, 240d; an fθ lens 241a, 241b, 241c, 241d; and a mirror pair 242a, 242b, 242c, 242d; and 243a, 243b, 243c, 243d. Incidentally, the semiconductor laser devices are not shown in FIG. 1.

The laser-beam scanner unit 227a of the first image forming section Pa receives a signal which is a portion of the image data supplied from the image processor 14 and which corresponds to a black component image separated from the color original image. The laser-beam scanner unit 227b of the second image forming section Pb receives a signal which is a portion of the image data supplied from the image processor 14 and which corresponds to a cyan component image separated from the color original image. The laser-beam scanner unit 227c of the third image forming section Pc receives a signal which is a portion of the image data supplied from the image processor 14 and which corresponds to a magenta component image separated from the color original image. The laser-beam scanner unit 227d of the fourth image forming section Pd receives a signal which is a portion of the image data supplied from the image processor 14 and which corresponds to an yellow component image separated from the color original image.

The chargers 223a–223d uniformly charges the respective photoconductor drums 222a–222d. The semiconductor laser devices of the laser-beam scanner units 227a–227d each emit laser beams modulated based on the signal applied thereto. The polygonal mirrors 240a–240d each direct the laser beam from the semiconductor laser device to a predetermined main-scan direction. The fθ lenses 241a–241d cooperate with the respective polygonal mirror pairs 242a–242d; 243a–243d to focus the laser beam directed thereto by the respective polygonal mirrors 240a–240d on the respective charged surfaces of the photoconductor drums 222a–222d for image formation. Thus, electrostatic latent images in correspondence to the four color components of the color original image are formed on the photoconductor drums 222a–222d, respectively.

The developing unit 224a of the first image forming section Pa stores a black toner. The developing unit 224b of the second image forming section Pb stores a cyan toner. The developing unit 224c of the third image forming section Pc stores a magenta toner. The developing unit 224d of the fourth image forming section Pd stores an yellow toner. The developing units 224a–224d serve to develop the electrostatic latent images on the photoconductor drums 222a–222d using the toners stored therein, respectively. This enables the image output unit 15 to reproduce the original image as toner images of black, cyan, magenta and yellow.

The transferring members 225a–225d transfer the respective toner images on the photoconductor drums 222a–222d to one side of the paper P carried on the transfer conveyor belt 216. After image transfer, the cleaner units 226a–226d remove the toner remaining on the respective photoconductor drums 222a–222d.

After completion of the toner image transfer in the fourth image forming section Pd, the static eliminator 229 progressively separates the paper P, from its leading edge, from the transfer conveyor belt 219. Subsequently, the paper P is led to the fixing device 217, wherein the transferred toner image is fixed to the paper P.

The paper P is passed through a nip between fixing rollers of the fixing device 217 and then through a transport-direction switching gate 218. The transport-direction switching gate 218 selectively switches a transport passage for the paper P with the toner image between a first passage for discharging the paper P out of the image forming apparatus 11 and a second passage for re-feeding the paper P to the image output unit 15. Where the first passage is selected by the transport-direction switching gate, a discharge roller discharges the paper P onto a discharge tray 220 mounted to an external wall of the main body of the image forming apparatus 11. Where the second passage is selected by the transport-direction switching gate, the paper P is delivered to a switchback transport passage 221 to be inverted by the switchback transport passage 221. Subsequently, the paper P is fed back again to the image output unit 15 via the sheet feeding mechanism 211.

In the above description, the laser-beam scanner units 227a–227d optically write to the respective photoconductor drums 222a–222d by scanning and irradiating the photoconductor drums with laser beam. The laser-beam scanning units 227a–227d may be replaced by LED (light emitting diode) heads, which are an optical writing system comprising a light emitting diode array and an imaging lens array. The LED head is smaller in size than the laser-beam scanner unit and is silent because of the absence of movable parts. On this account, the LED head is preferably employed by a tandem digital color image forming apparatus which requires a plurality of optical writing units.

In the above description, the image output unit 15 is embodied in an electrophotographic printer because the image processor 14 outputs CMYK image data. However, the image output unit 15 is not limited to the electrophotographic printer but may be embodied in any other apparatus such as an inkjet printer or the like.

The image processor 14 does not limit its output to CMYK image data but may output image data of other types, such as RGB image data, L*a*b* image data and the like. In this case, the configurations of the image output unit 15 and the image forming apparatus 11 may be defined according to the composition of image data outputted from the image output unit. The following description with reference to FIGS. 2–22 exemplifies a case where the image processor 14 outputs RGB data. In the case of RGB data output, the image output unit 15 is embodied in a display unit, for example.

Figure 2:
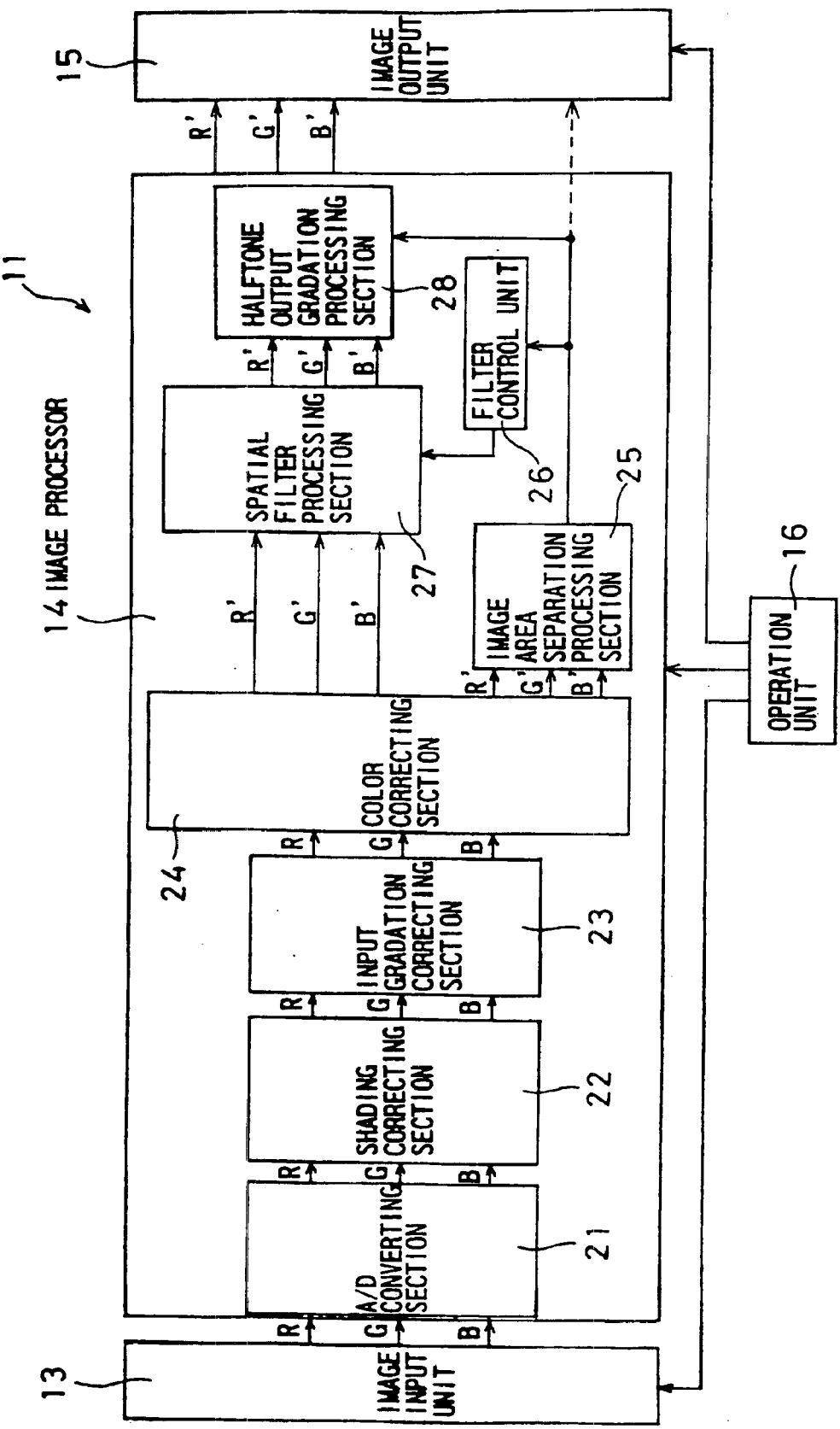
FIG. 2 is a block diagram showing the configuration of the image forming apparatus with the image processor according to the first embodiment.

FIG. 2 is a block diagram showing a configuration of the image forming apparatus 11 including the image processor 14 according to the first embodiment of the invention. The image forming apparatus 11 includes the image input unit 13, the image output unit 15 and an operation unit 16 additionally to the image processor 14. The image input unit 13 inputs an image to be processed. The image processor 14 applies a predetermined process to the input image. The image output unit 15 outputs an image processed by the image processor 14. The operation unit 16 is used when an operator of the image forming apparatus 11 gives an instruction to the image forming apparatus 11. An image input resolution of the image output unit 13 and an image output resolution of the image output unit 15 are previously defined. In this embodiment, the image input unit 13 is described by way of an example of a scanner system capable of reading a color image. The scanner system reads a target original face at the predetermined input resolution and generates RGB-base reflectance signal as an analog image signal representing the image on the original for providing input to the image processor 14.

The image processor 14 includes an analog/digital (hereinafter, simply referred to as "A/D") conversion unit 21, a shading correcting section 22, an input gradation correcting section 23, a color correcting section 24, an image-area separation processing section 25, a filter control unit 26, a spatial filter processing section 27 and a halftone output gradation processing section 28.

The A/D converting section 21 digitally converts the RGB-base reflectance signal supplied from the image input unit 13. The shading correcting section 22 applies a shading correction process to the A/D converted reflectance signal. The shading correction process is performed for elimination of various signal distortions resulting from the configurations of the lighting system, imaging system and image-pickup system. The input gradation correcting section 23 applies an input gradation process to the reflectance signal corrected for the shading. The input gradation process converts the reflectance signal to a manageable signal for the image processor 14, such as density signal. The input gradation correcting section 23 may further perform a color balance process to the reflectance signal. The color correcting section 24 applies a color correction process to the density signal outputted from the input gradation correcting section 23 for permitting the image output unit 15 to provide faithful color reproduction. Hererinafter, the A/D conversion, shading correction, input gradation correction and color correction will be collectively referred to as "preprocess". The preprocessed image density signal is a digital signal representative of red, green and blue (hereinafter referred to as "RGB") data on each pixel constituting the image, which data will hereinafter be referred to as "image data". The RGB data on pixel is obtained by separating each pixel into the three RGB colors. The image data is supplied to the image-area separation processing section 25 and the spatial filter processing section 27.

The image-area separation processing section 25 performs an image-area separation process based on the image data. The image-area separation process separates the image into a character area, a photographic area and a dot area by discriminating character, photograph and dot from one another. The image-area separation processing section 25 is equivalent to the dot-area extraction means for extracting a dot area in the image. The dot area corresponds to a portion of the original image, which is represented in halftone using dots. There are plural types of dots with different scanning densities. In order to determine whether an arbitrary area in the image is a dot area or not, Fourier Transform method, for example, may be used to determine whether a density pattern of the arbitrary area has periodicity or not. If a spatial frequency distribution of the area given by the Fourier Transform shows that the spatial frequencies are limited in a particular band, the area is determined to be the dot area because the density pattern of the area has the periodicity. The process results of the image-area separation processing section 25 are supplied to the filter control unit 26 and the halftone output gradation processing section 28. The process results of the image-area separation processing section 25 may also be supplied to the image output unit 15.

The filter control unit 26 uses the process results of the image-area separation processing section 25 and the preprocessed image data for adjusting the characteristic of the spatial filter processing section 27 for each of the areas in the image. Based on the adjusted characteristic, the spatial filter processing section 27 spatially filters the preprocessed image data for limiting the spatial frequency components of the area in the image. Operations of the spatial filter processing section 27 will be described in detail later.

The halftone output gradation processing section 28 applies a gradation correction process and a halftone generation process to the image data outputted from the spatial filter processing section 27. The halftone generation process divides the image into plural pixels for reproduction of pixel gradations. The halftone output gradation processing section 28 may also perform a process for converting a density value of the image data to a dot-area ratio indicative of a characteristic value of the image output unit 15. Hereinafter, the gradation correction and halftone generation processes will be collectively referred to as "postprocess". The postprocessed image data is supplied to the image output unit 15.

Figure 3:
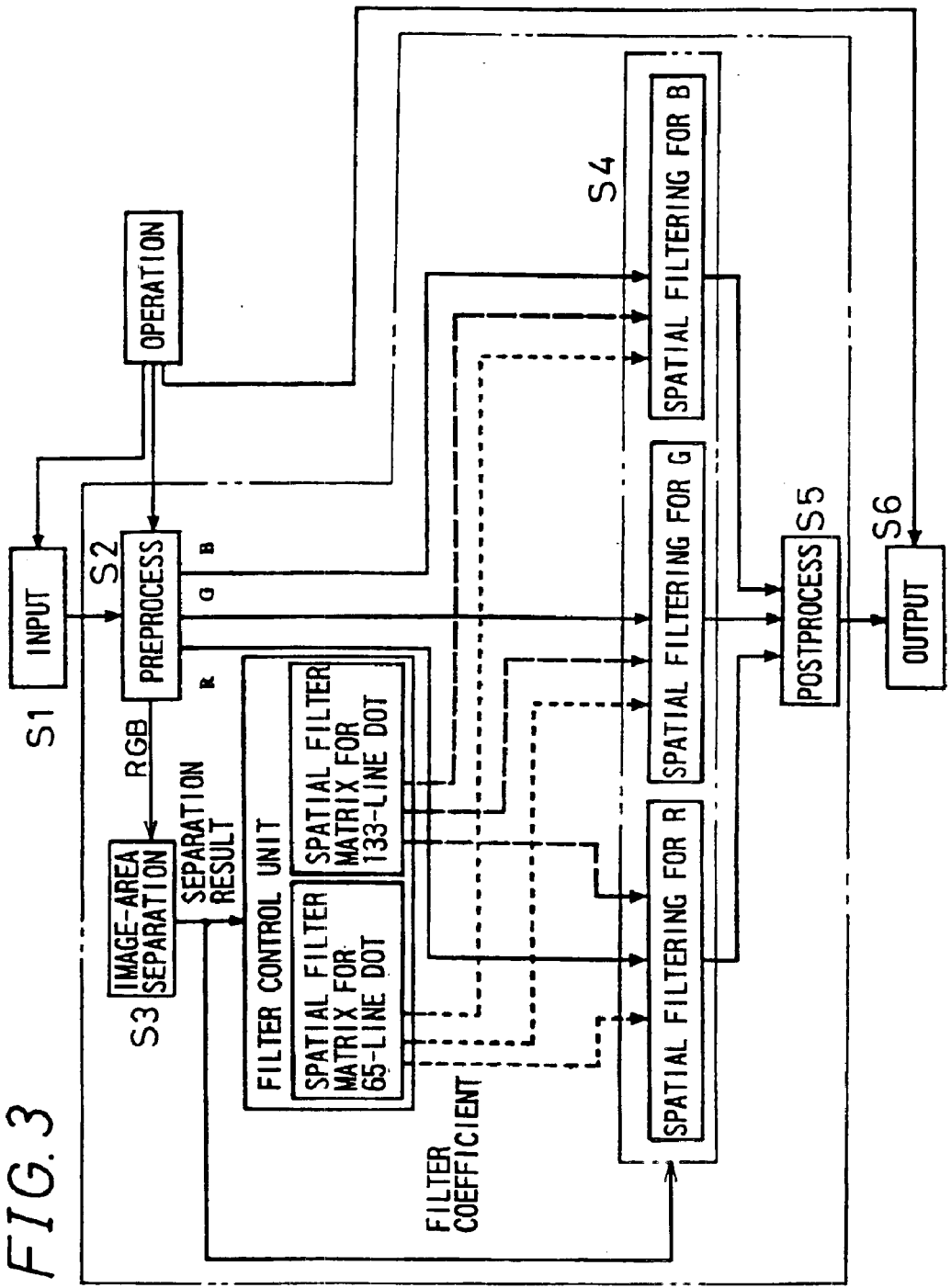
FIG. 3 is a block diagram illustrating a process performed by the image forming apparatus of FIG. 2 wherein RGB-base image data is processed.

FIG. 3 is a block diagram illustrating a process of from image input to image output which is carried out in the image forming apparatus 11 of FIG. 2. When the operator manipulates the operation unit 16 to produce copy of the original, the image input unit 13 performs Step S1 to read the original and supply the read data to the image processor 14. In the image processor 14, the units of from the A/D converting section 21 to the color correcting section 24 are involved in the preprocess at Step S2 whereas the image-area separation processing section 25 performs the image-area separation process at Step S3.

The spatial filter processing section 27 performs Step S4 to perform a spatial filter process to a portion (hereinafter referred to as "dot portion") of the preprocessed image data in correspondence to the dot area for removing moire from the dot area. The spatial filter process is discretely applied to the respective RGB data pieces. When processing each of the RGB data pieces, the spatial filter processing section 27 has the same characteristic. The spatial filter processing section 27 may not spatially filter the other image-data portion than the dot portion, directly outputting that portion. Otherwise, the spatial filter processing section may spatially filter the other image-data portion according to spatial frequency characteristics of the sub-image area exclusive of the dot area and then provide an output. The halftone output gradation processing section 28 performs Step S5 to postprocess the spatially filtered image data and to provide an output to the image output unit 15. The image output unit 15 performs Step S6 to output an image based on the postprocessed image data.

The image processor 14 aims at reducing moire appearing in the dot area by using the spatial filter processing section 27. A main causative factor of the moire appearance in the dot area is interference between different periods associated with a combination of the input resolution of the image input unit 13 and the output resolution of the image output unit 15. Where the input resolution and the output resolution differ from each other, a moire pattern is formed as a result of interference between dot formation periods different from each other. In the image forming apparatus 11, the input resolution and the output resolution are previously determined. Therefore, a spatial frequency most likely to cause moire can be determined beforehand by using a model based on the combination of the dot formation period of the image input unit 13 and the dot formation period of the image output unit 15.

Figure 4:
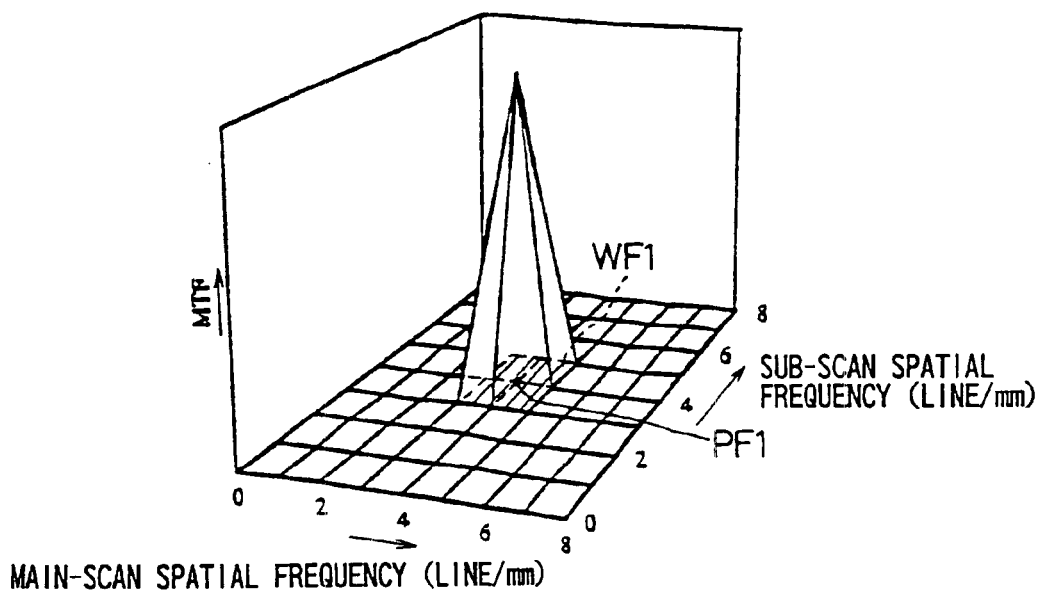
FIG. 4 is a graph representing a spatial frequency characteristic of a dot area of 65-line dot.
Figure 5:
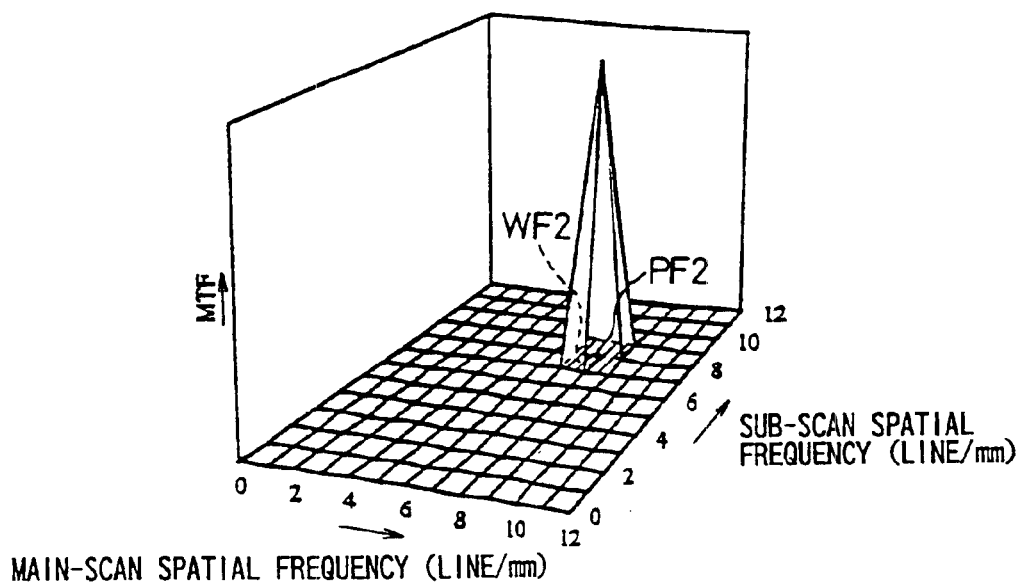
FIG. 5 is a graph representing a spatial frequency characteristic of a dot area of 133-line dot.

FIG. 4 is a graph schematically representing a spatial frequency characteristic of a dot area using 65-line dot (hereinafter simply referred to as "dot area of 65-line dot"). FIG. 5 is a graph schematically representing a spatial frequency characteristic of a dot area using 133-line dot (hereinafter simply referred to as "dot area of 133-line dot"). FIGS. 4 and 5 exemplify a case where an image is represented by the dither halftone representation method using 3×3 dither matrix when the input resolution and the output resolution are at 600 dpi. In the graphs of FIGS. 4 and 5, the term "main-scan spatial frequency" denotes spatial frequencies of dots in the same direction with a scanning direction of the image input unit 13. The term "sub-scan spatial frequency" denotes a spatial frequencies of dots in a direction orthogonal to the scanning direction of the image input unit 13. A plane defined by axes of the main-scan spatial frequency and the sub-scan spatial frequency is defined as spatial frequency plane. The unit of spatial frequency is the number of lines per millimeter (lines/mm), or scanning density (1 pi). The vertical axis of the graph shows MTF (modulation transfer function).

In the dot area of 65-line dot shown in FIG. 4, the MTF peaks at a point PF1 where the main-scan spatial frequency and the sub-scan spatial frequency in the spatial frequency plane are at 4 lines/mm, respectively. The figure shows that the MTF presents a peak line in a band WF1 covering ±1 line/mm about the point PF1. In the dot area of 133-line dot shown in FIG. 5, the MTF peaks at a point PF2 where the main-scan spatial frequency and the sub-scan spatial frequency in the spatial frequency plane are at 8 lines/mm, respectively, and presents a peak line in a band WF2 covering ±1 line/mm about the point PF2. In FIGS. 4–5, the respective shaded portions of the spatial frequency plane correspond to the bands WF1 and WF2. In the description hereinbelow, the respective graphs of FIGS. 4–5 representing the spatial frequency characteristic of the dot area are replaced by FIGS. 6–7 which represent the spatial frequency plane as the 1-D spatial frequency axis for simplicity.

The image processor 14 of the embodiment is characterized by the characteristic of the spatial filter processing section 27 performing the spatial filter process forborne removal. The characteristic of the spatial filter processing section 27 is described in detail by way of examples of the dot area of 65-line dot and the dot area of 133-line dot. In this specification, a spatial frequency band containing all the spatial frequencies to be contained in the subject image is referred to as "allowable spatial frequency band". The minimum spatial frequency to be contained in the image is zero.

The spatial filter processing section 27 performing the spatial filter process for moire removal has the characteristic of attenuating the entirety of the spatial frequency components to be contained in the image while further attenuating or removing a component of a predetermined moire-causative frequency (hereinafter referred to as "moire frequency"). The spatial filter processing section 27 defined with such a characteristic is equivalent to the moire-removing spatial filter means. In the dot area, not only the moire frequency component but also frequency components neighboring the moire frequency may cause the moire appearance. A spatial frequency band, which includes the moire frequency and its neighboring frequencies, thus being liable to cause the moire appearance, is simply referred to as "moire-frequency band".

Figure 8:
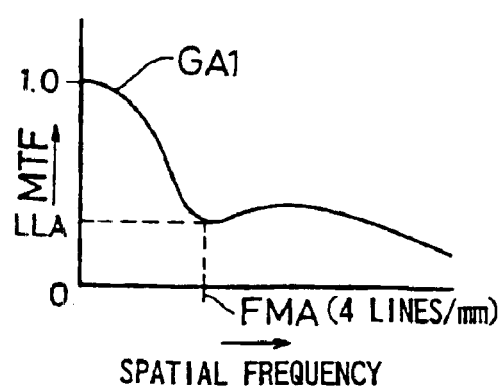
FIG. 8 is a graph representing an ideal characteristic of a spatial filter processing section for 65-line dot.

FIG. 8 is a graphical representation of an ideal characteristic GA1 of the spatial filter processing section 27 for 65-line dot. FIG. 9 is a graphical representation of an ideal characteristic GB1 of the spatial filter processing section 27 for 133-line dot. "FMA" in FIG. 8 denotes a moire frequency for the 65-line dot whereas "FMB" in FIG. 9 denotes a moire frequency for the 133-line dot. In the graphical representations of filter characteristics herein, the horizontal axis represents the spatial frequency plane as the 1-D spatial frequency axis while the vertical axis represents MTF. When the MTF is less than 1.0, the filter characteristic shows an attenuating tendency. When the MTF is above 1.0, the filter characteristic shows an emphasizing tendency.

With the ideal characteristics GA1, GB1, the spatial filter processing section 27 essentially tends to attenuate and particularly suppresses the frequency band liable to cause the moire appearance. Hence, the ideal characteristic GA1 or GB1 of the spatial filter processing section 27 is such that the MTF for the overall allowable spatial frequency band is less than a MTF value at the spatial frequency of 0 (hereinafter referred to as "reference MTF") and presents the minimum value at the moire frequency FMA or FMB. The reference MTF is at 1.0.

The spatial filter processing section 27 is preferably embodied in a digital filter. The characteristic of the spatial filter embodied in the digital filter is defined by a matrix comprising plural filter coefficients. The matrix is used in a spatial filtering operation which is performed based on an arbitrary pixel (hereinafter referred to as "target pixel") and is applied to plural data pieces on pixels constituting a block defined in the image. The spatial filtering operation is performed plural times as changing the target pixel. The filter coefficient is a coefficient for weighting pixel data.

The matrix defining the characteristic of the moire-removing spatial filter processing section 27 is obtained by convoluting a matrix defining a characteristic of a filter (hereinafter referred to as "first filter") for attenuating or removing the spatial frequency component of the moire frequency with a matrix defining a smoothing filter characteristic. Hereinafter, the matrix defining the characteristic of the moire-removing spatial filter processing section 27 is referred to as "spatial filter matrix"; the matrix defining the first filter characteristic as "first-filter matrix"; and the matrix defining the smoothing filter characteristic as "smoothing-filter matrix".

FIG. 10 is a graph representing an ideal characteristic GA3 of the first filter used in the definition of the ideal characteristic of the spatial filter processing section 27 for 65-line dot, which is shown in FIG. 8. FIG. 11 is a graph representing an ideal characteristic GB3 of the first filter used in the definition of the ideal characteristic of the spatial filter processing section 27 for 133-line dot, which is shown in FIG. 9. In the ideal characteristics GA3, GB3 of the first filter, the MTF presents the minimum value at the respective moire frequencies FMA, FMB and values of less than 1.0 in the moire-frequency band.

The first filter is preferably embodied in a band-cut filter wherein the MTF presents the minimum value at the moire frequency. A cutoff frequency of such a band-cut filter coincides with the moire frequency. It is noted that the first filter is not limited to the band-cut filter but may be any other filter that has the characteristic of attenuating or removing the moire frequency component.

Figure 12:
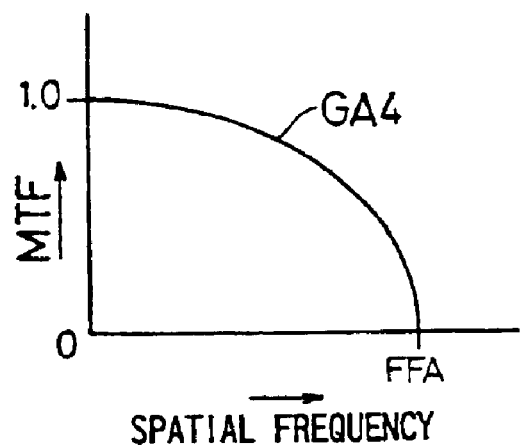
FIG. 12 is a graph representing an ideal characteristic of a smoothing filter for defining the ideal characteristic of the spatial filter processing section for 65-line dot.
Figure 13:
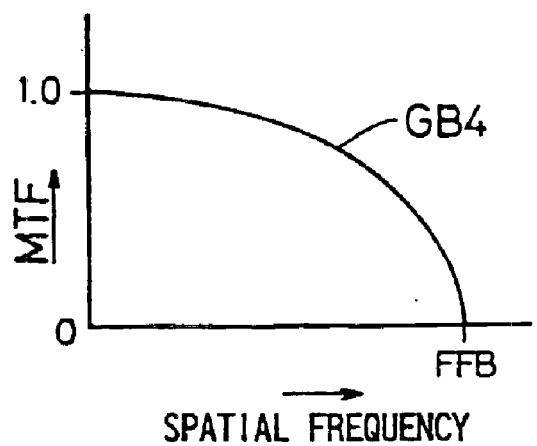
FIG. 13 is a graph representing an ideal characteristic of the smoothing filter for defining the ideal characteristic of the spatial filter processing section for 133-line dot.

The smoothing filter has the characteristic of attenuating the entirety of the spatial frequency components to be contained in the image. FIG. 12 is a graph representing an ideal characteristic GA4 of the smoothing filter used in the definition of the ideal characteristic of the spatial filter processing section 27 for 65-line dot, which is shown in FIG. 8. FIG. 13 is a graph representing an ideal characteristic GB4 of the smoothing filter used in the definition of the ideal characteristic of the spatial filter processing section 27 for 133-line dot, which is shown in FIG. 9. In the ideal smoothing filter characteristics GA4, GB4, the MTF is less than 1.0 at all the spatial frequencies in the allowable spatial frequency band. The MTF of the smoothing filter may vary in any manner with variations of the spatial frequency so long as its value is always less than 1.0.

Figure 6:
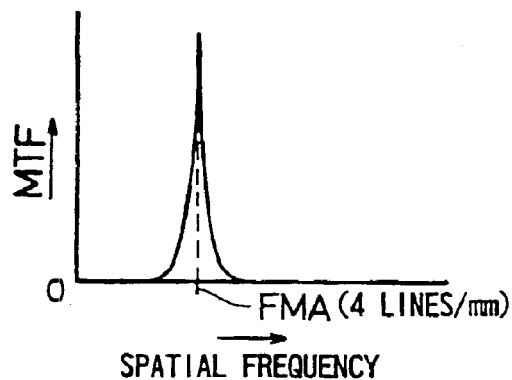
FIG. 6 is a graph representing the spatial frequency characteristic of the dot area of 65-line dot.

The spatial filter processing section 27 has the characteristic illustrated in FIG. 8 or 9 for the following reason. Where the 65-line dot is used in the dot area, the spatial frequency characteristic of the 65-line dot, as shown in FIG. 6, is obtained by preliminary determination of the moire frequency of the 65-line dot. In the spatial frequency characteristic of the 65-line dot thus obtained, the moire-frequency band corresponds to a band in which the MTF is increased in a peaked fashion so that the spatial filter processing section 27 is adapted to attenuate the spatial frequency components in the moire-frequency band. The first filter attenuating or removing the spatial frequency components in the moire-frequency band, as shown in FIG. 10, is applied to the attenuation of the spatial frequency components in the moire-frequency band.

Besides the moire due to the spatial frequencies in the moire-frequency band, the dot area contains moire caused by spatial frequencies of a band other than the moire-frequency band. The moire due to the spatial frequencies of the other band is visually less perceptible than that due to the spatial frequencies of the moire-frequency band. If only the first filter of FIG. 10 is used for attenuating the spatial frequency components of the dot area of 65-line dot, only the moire due to the spatial frequency components of the moire-frequency band is suppressed but the moire due to the spatial frequency components of the other band still appears. As a result, the image quality of the dot area is degraded because the attenuation process has failed to provide a coherent moire suppression across the dot area. Therefore, the smoothing process must be applied to the spatial frequency components of the other band so as to suppress the moire due to the spatial frequencies of the other band. For smoothing of the spatial frequency components of the other band, the smoothing filter, as shown in FIG. 12, is used to attenuate the entirety of the spatial frequency components in the allowable spatial frequency band.

Figure 7:
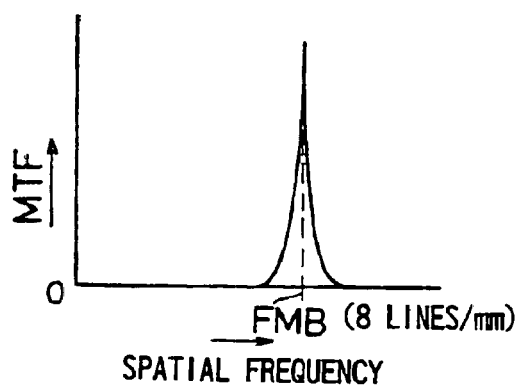
FIG. 7 is a graph representing the spatial frequency characteristic of the dot area of 133-line dot.

On the ground of the aforementioned reason, the spatial filter processing section 27 for 65-line dot has the characteristic, as shown in FIG. 8, which is equivalent to a characteristic of a band-pass filter and is obtained by combining the first filter characteristic of FIG. 10 and the smoothing filter characteristic of FIG. 12. The spatial filter processing section 27 is adapted to perform the process for particularly attenuating the spatial frequency components of the moire-frequency band concurrently with the smoothing process for attenuating all the other spatial frequency components than those of the moire-frequency band. By using the spatial filter processing section 27 with the characteristic of FIG. 8, the moire is sufficiently suppressed to become visually unperceptible in the overall allowable spatial frequency band. Thus, the spatial filter processing section 27 accomplishes an even greater improvement in the quality of the spatially filtered image than the band-cut filter which attenuates only the spatial frequency components of the moire-frequency band.

Where the 133-line dot is used in the dot area, a moire-frequency band, as shown in FIG. 7, is first determined based on the input resolution and the output resolution in a similar manner to the dot area of 65-line dot. Subsequently, the filter characteristic of attenuating the entirety of the spatial frequency components of the allowable spatial frequency band and of further attenuating or removing the spatial frequency components of the found moire-frequency band is defined by combining the first filter characteristic of FIG. 11 and the smoothing filter characteristic of FIG. 13. If the spatial filter process is performed using the spatial filter processing section 27 with the characteristic of FIG. 9, the moire-causative factor in the dot area is reduced to provide a visual effect that the moire appearance is reduced in the entirety of the frequency band. Thus, the image spatially filtered by the spatial filter processing section 27 is improved in quality much more than an image subjected to the spatial filter process using the band-cut filter alone.

On the ground of the aforementioned reason, the spatial filter matrix is defined based on the moire-frequency band determined by combining the input resolution and the output resolution. The filter coefficients of the spatial filter matrix are defined by convoluting the first filter matrix having the filter coefficients defined based on the moire-frequency band with the smoothing filter matrix. This provides the filter adapted for a particularly effective attenuation of the moire-frequency band as well as for an appropriate attenuation of the other spatial frequency bands.

In the spatial filter process at Step S4 of FIG. 3, a subject of the spatial filter process of the embodiment is the dot area so that the characteristic of the spatial filter processing section 27 varies depending upon the dot types. Accordingly, the spatial filter matrix is defined according to the dot type prior to the execution of the spatial filter process. The predetermined spatial filter matrix is stored in a storage unit of the spatial filter processing section 27 or the filter control unit 26. Where two or more spatial filter matrices are prepared, it is preferred for the filter control unit 26 to change the spatial filter matrix for use in the spatial filter processing section 27 according to the dot type.

Figure 14:
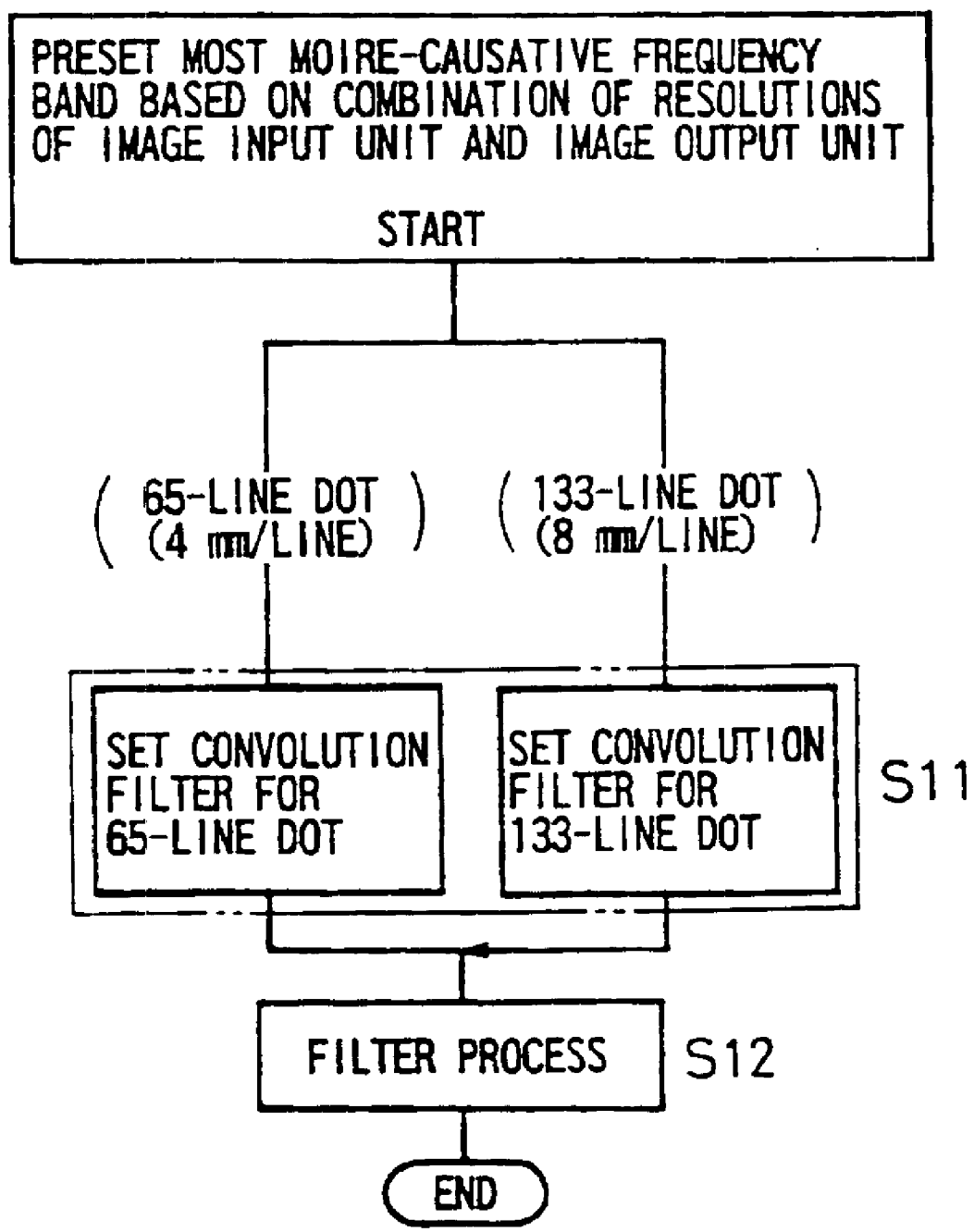
FIG. 14 is a block diagram illustrating a process for controlling the characteristic of the spatial filter processing section.

FIG. 14 is a block diagram illustrating a process for the a filter control unit 26 to control the characteristic of the spatial filter processing section 27. FIG. 14 exemplifies a case where the spatial filter matrix for 65-line dot and the spatial filter matrix for 133-line dot are already defined. When the operator manipulates the operation unit 16 to produce copy of the original, the filter control unit 26 starts to operate after the original is read by the image input unit 13. The filter control unit 26 performs Step S11 to supply the spatial filter processing section 27 with a dot portion of the image data and either of the spatial filter matrices for 65-line dot and for 133-line dot. It is preferred that the filter control unit selects either of the two filter matrices based on which of the 65-line dot and the 133-line dot is used in the dot area. In Step S12, the filter control unit 26 causes the spatial filter processing section 27 to start the spatial filter process.

As a result of the process of FIG. 14, the spatial filter processing section 27 is supplied with a single spatial filter matrix and the dot portion and hence, the spatial filter processing section 27 performs the spatial filter process for moire removal. Although two spatial filter matrices are prepared in the example of FIG. 14, three or more matrices may be prepared because the matrices to be prepared are not limited to the above. An alternative arrangement is possible wherein only one spatial filter matrix is prepared so that the spatial filter processing section 27 uses the same matrix at all times.

The characteristic of the spatial filter processing section 27 practically varies with variations of the characteristics of the image input unit 13 and of the image output unit 15. The practical characteristic of the spatial filter processing section 27 is optimized in the following manner. Firstly, a test is performed wherein the image forming apparatus 11 configured as shown in FIG. 2 is used to produce copy of an experimental original and a resultant image output is visually checked to determine whether moire is present in a dot area of the image or not. The test is performed plural times with the characteristic of the spatial filter processing section 27 changed each time. After the plural tests, a characteristic of the spatial filter processing section 27 when an image with the least moire appearance is outputted may be regarded as the optimum characteristic. As restricted by the configuration of the digital filter, the practical characteristic of the spatial filter processing section 27 may not coincide with the ideal characteristic. In this case, a characteristic most resemblant to the ideal characteristic may be selected from the plural characteristics used in the optimization test.

In the characteristic of the spatial filter processing section 27, a frequency at which the MTF presents the minimum value may be varied by changing the weighting of the central pixel of the first filter used in the convolution operation for the spatial filter matrix. The MTF for the overall characteristic of the spatial filter processing section 27 may be varied by changing the weighting of the central pixel of the smoothing filter used in the convolution operation for the spatial filter matrix. The greater the weighting of the central pixel of the smoothing filter, the stronger the MTF for the overall characteristic of the spatial filter processing section 27.

The optimum spatial filter matrix is described hereinbelow by way of examples of 65-line dot and 133-line dot. The following description exemplifies a case where both the first filter matrix and the smoothing filter matrix are embodied in a matrix of three rows and three columns (3×3) while the spatial filter matrix is embodied in a matrix of five rows and five columns (5×5). In the 3×3 matrix and 5×5 matrix, the target pixel is at the center of a block while a filter coefficient for the target pixel is at the center of the matrix. Of all the pixels in the block, the other pixels than the target pixel are referred to as "neighboring pixels". The smoothing filter matrix used for obtaining the spatial filter matrix is preferably embodied in a smoothing filter matrix where all the filter coefficients has an equal value. More preferably, the smoothing filter matrix used for obtaining the spatial filter matrix is embodied in a smoothing filter matrix where a filter coefficient for the target pixel has a greater value than those for the neighboring pixels.

Now referring to FIGS. 15–18, description is made on an optimum spatial filter matrix defined by using the smoothing filter matrix with all the filter coefficients at the same value. In this the embodiment, all the filter coefficients in the smoothing filter matrix are at 1. A spatial filtering operation using the smoothing filter matrix with all the filter coefficients at the equal value is equivalent to an operation for finding an arithmetic mean of data on the all pixels in the block.

Figure 15:
FIG. 15 is a diagram showing a determinant for defining an optimum spatial filter matrix for 65-line dot using a smoothing filter matrix wherein all the filter coefficients has an equal value.

FIG. 15 is a diagram showing a determinant for defining an optimum spatial filter matrix for 65-line dot. In the determinant of FIG. 15, the first term on the left represents an optimum first filter matrix MA1 for 65-line dot whereas the second term on the left represents an optimum smoothing filter matrix MA2 for 65-line dot. The term on the right represents an optimum spatial filter matrix MA3 for 65-line dot, which is obtained by convoluting the optimum first filter matrix MA1 for 65-line dot and the optimum smoothing filter matrix MA2 for 65-line dot.

Figure 16A:
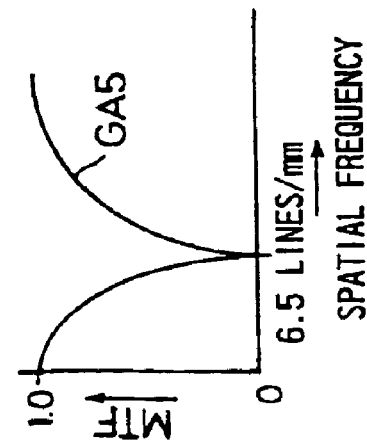
FIGS. 16A–16C are graphs representing characteristics defined by the respective matrices of the determinant in FIG. 15.

FIG. 16A graphically represents an optimum characteristic GA5 of the first filter for 65-line dot. The optimum characteristic GA5 of the first filter is defined by the optimum first filter matrix MA1 shown in FIG. 15. The optimum first filter characteristic is that of a band-cut filter with a cutoff frequency at 6.5 lines/mm.

Figure 16B:
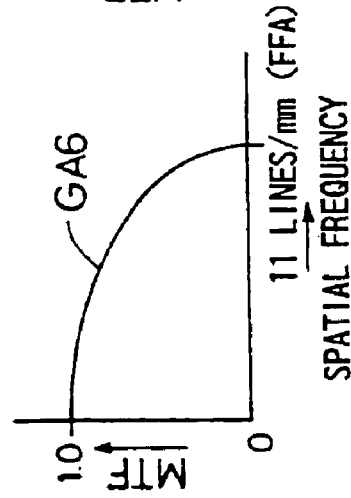

FIG. 16B graphically represents an optimum characteristic GA6 of the smoothing filter for 65-line dot. The optimum smoothing filter characteristic GA6 is defined by the optimum smoothing filter matrix MA2 of FIG. 15. In the optimum smoothing filter characteristic GA6, the reference MTF is at 1.0 while the MTF approaches 0 with increase in the spatial frequency in a band below a predetermined upper-limit spatial frequency FFA and stays at 0 in a frequency band equal to and above the upper-limit spatial frequency FFA. The upper-limit spatial frequency FFA, shown in FIG. 16, is at 11 lines/mm and is higher than the moire frequency FMA.

Figure 16C:
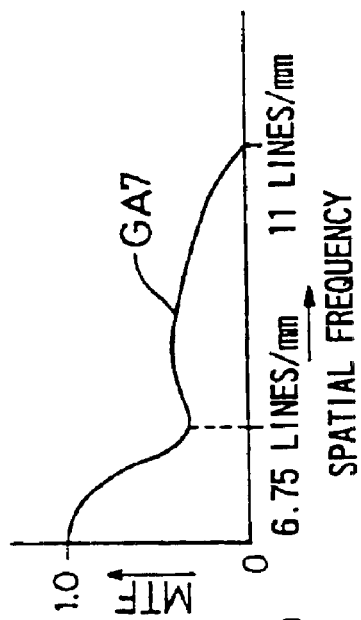

FIG. 16C graphically represents an optimum characteristic GA7 of the spatial filter processing section 27 for 65-line dot. The optimum characteristic GA7 of the spatial filter processing section 27 is defined by the optimum spatial filter matrix MA3 of FIG. 15. In the optimum characteristic GA7 of the spatial filter processing section 27, the MTF presents the minimum value at a spatial frequency of 6.75 lines/mm instead of the moire frequency FMA for 65-line dot. Except for this, the characteristic GA7 has the same configuration as the ideal characteristic GA1 of the spatial filter processing section 27 for 65-line dot in FIG. 8.

Figure 17:
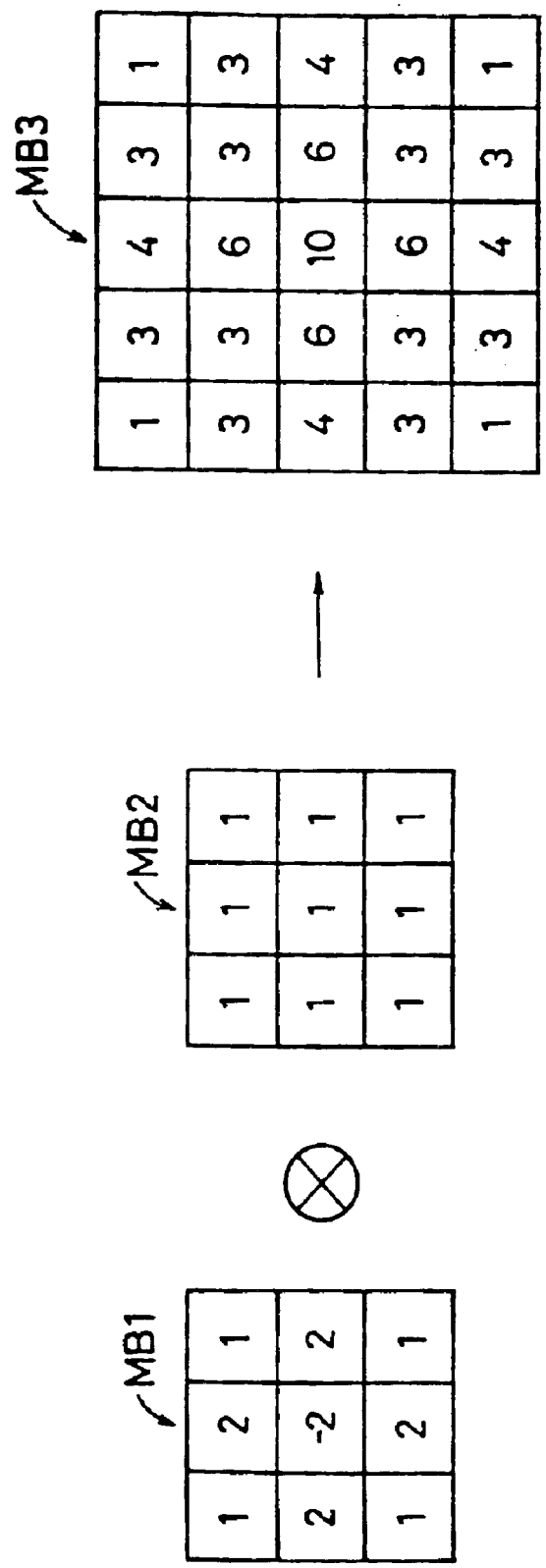
FIG. 17 is a diagram showing a determinant for defining an optimum spatial filter matrix for 133-line dot using a smoothing filter matrix wherein all the filter coefficients have an equal value.

FIG. 17 is a diagram showing a determinant for defining an optimum spatial filter matrix for 133-line dot. In the determinant of FIG. 17, the term on the right represents an optimum spatial filter matrix MB3 for 133-line dot, which is obtained by convoluting an optimum first filter matrix MB1 for 133-line dot, the first term on the left, with an optimum smoothing filter matrix MB2 for 133-line dot, the second term on the left. The same matrix as the optimum smoothing filter matrix MA2 for 65-line dot in FIG. 15 is applied to the second term on the left shown FIG. 17.

Figure 18A:
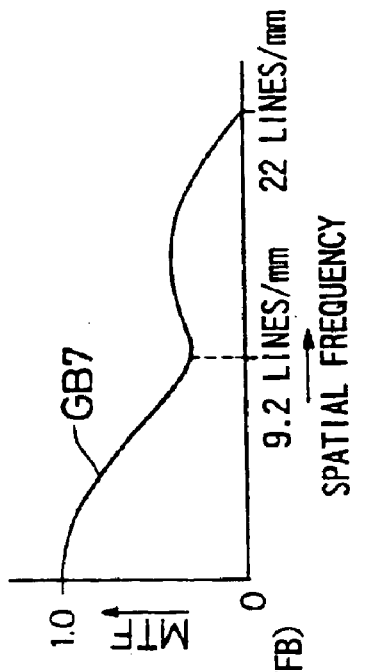
FIGS. 18A–18C are graphs representing characteristics defined by the respective matrices of the determinant in FIG. 17.
Figure 18B:
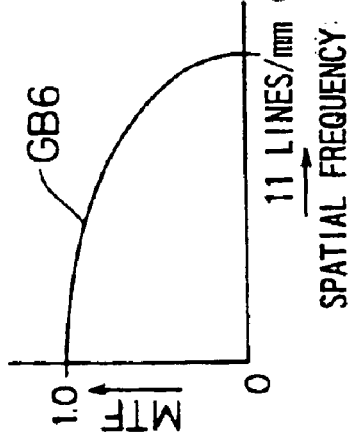

FIG. 18A graphically represents an optimum characteristic GB5 of the first filter for 133-line dot. The optimum characteristic GB5 of the first filter is defined by the first filter matrix MB1 shown in FIG. 17. The optimum first filter characteristic GB5 is that of a band-cut filter with a cutoff frequency at 9.2 lines/mm. FIG. 18B graphically represents an optimum characteristic GB6 of the smoothing filter for 133-line dot. The optimum smoothing filter characteristic GB6 is defined by the smoothing filter matrix MB2 shown in FIG. 17. The optimum smoothing filter characteristic GB6 is identical with the smoothing filter characteristic GA6 of FIG. 16B.

Figure 18C:
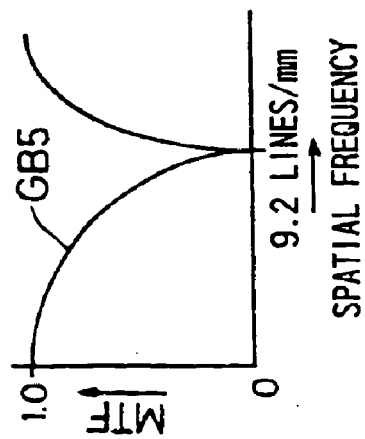
Figure 20:
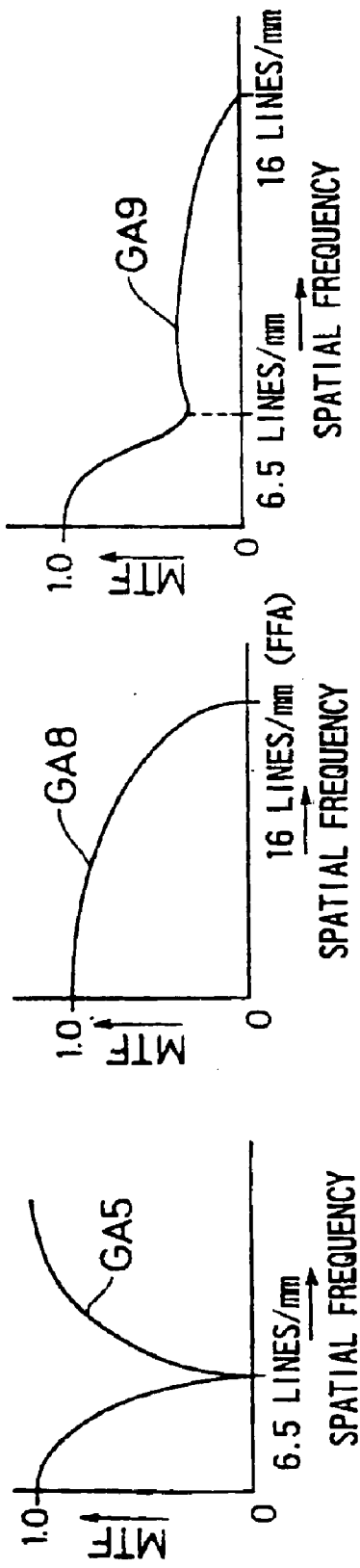
FIGS. 20A–20C are graphs representing characteristics defined by the respective matrices of the determinant in FIG. 19.
Figure 22:
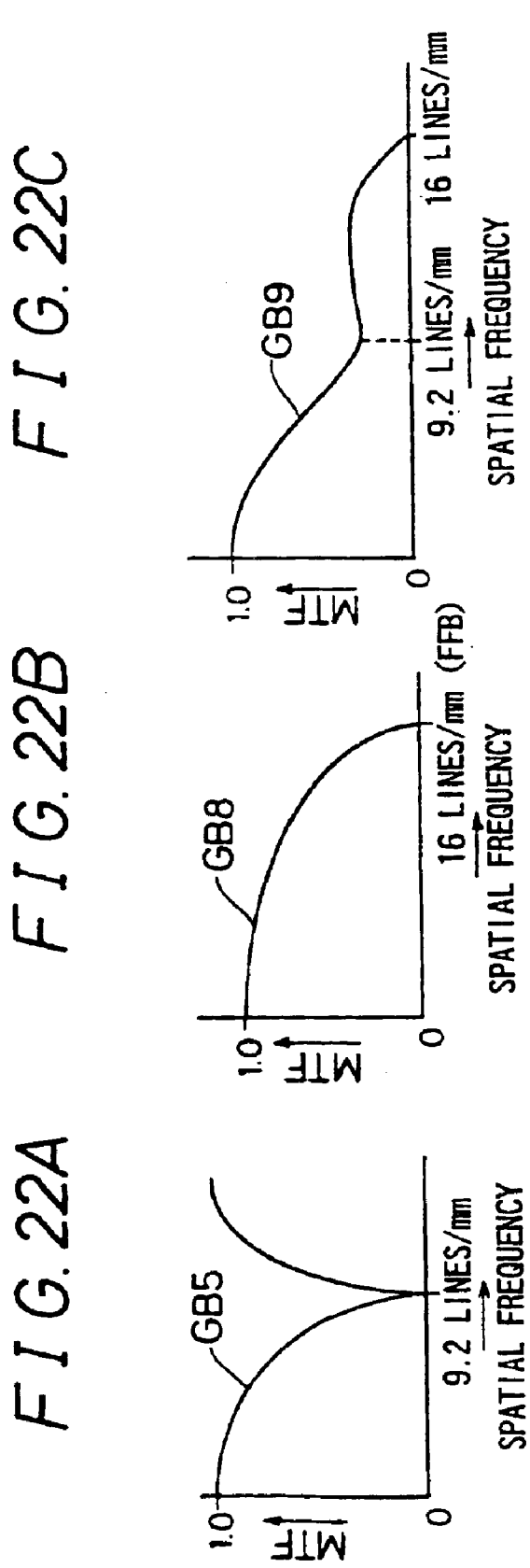
FIGS. 22A–22C are graphs representing characteristics defined by the respective matrices of the determinant in FIG. 21.

FIG. 18C graphically represents an optimum characteristic GB7 of the spatial filter processing section 27 for 133-line dot. The optimum characteristic GB7 of the spatial filter processing section 27 is defined by the optimum spatial filter matrix MB3 shown in FIG. 17. In the optimum characteristic GB7 of the spatial filter processing section 27, the MTF presents the minimum value at a spatial frequency of 9.2 lines/mm instead of the moire frequency FMB for 133-line dot, and stays at 0 in a spatial frequency band of 22 lines/mm and above. Except for this, the characteristic GB7 has the same configuration as the ideal characteristic GB1 of the spatial filter processing section 27 for 133-line dot shown in FIG. 9.

As described with reference to FIGS. 15–18, where the spatial filter matrix is defined by using the smoothing filter matrix wherein all the filter coefficients have the same value, the spatial filter processing section 27 is imparted with a more suitable characteristic for the spatial filter process for moire removal.

Now referring to FIGS. 19–22, description will be made on an optimum spatial filter matrix defined by using a smoothing filter matrix wherein the filter coefficient for the target pixel has a greater value than those for the neighboring pixels. A matrix operation using the matrix with filter coefficients of different values is equivalent to an operation for weighted averaging of data on all the block pixels inclusive of the target pixel.

FIG. 19 is a diagram showing a determinant for defining an optimum spatial filter matrix MA5 for 65-line dot. In the determinant of FIG. 19, the term on the right represents the optimum spatial filter matrix MA5 for 65-line dot, which is obtained by convoluting the optimum first filter matrix MA1, the first term on the left, with an optimum smoothing filter matrix MA4, the second term on the left. The same matrix as the optimum first filter matrix MA1 for 65-line dot of FIG. 15 is applied to the first term of FIG. 19. In the optimum smoothing filter matrix MA4 of FIG. 19, the filter coefficient for the target pixel has a value of 4. Filter coefficients for pixels vertically or horizontally adjoining the target pixel have a value of 2. Filter coefficients for the four remaining neighbor pixels diagonally adjoining the target pixel have a value of 1, which is the smallest value of all the filter coefficients because these neighbor pixels are positioned farthest from the target pixel in the block.

FIG. 20A graphically represents the optimum characteristic GA5 of the first filter for 65-line dot, which is the same as that shown in FIG. 16A. FIG. 20B graphically represents an optimum characteristic GA8 of the smoothing filter for 65-line dot. The optimum smoothing filter characteristic GA8 is defined by the optimum smoothing filter matrix MA4 shown in FIG. 19. The optimum smoothing filter characteristic GA8 has the same configuration as the optimum smoothing filter characteristic GA4 of FIG. 16B, except that the upper-limit spatial frequency FFA is at 16 lines/mm.

FIG. 20C graphically represents an optimum characteristic GA9 of the spatial filter processing section 27 for 65-line dot. The optimum characteristic GA9 of the spatial filter processing section 27 is defined by the spatial filter matrix MA5 of FIG. 19. In the optimum characteristic GA9 of the spatial filter processing section 27, the MTF presents the minimum value at a frequency of 6.5 lines/mm instead of the moire frequency FMA for 65-line dot and stays at 0 in a frequency band of 16 lines/mm and above. Except for this, the characteristic GA9 has the same configuration as the ideal characteristic GA1 of the spatial filter processing section 27 for 65-line dot shown in FIG. 8.

FIG. 21 is a diagram showing a determinant for defining an optimum spatial filter matrix MB5 for 133-line dot. In the determinant of FIG. 21, the term on the right represents the optimum spatial filter matrix MB5 for 133-line dot, which is obtained by convoluting the optimum first filter matrix MB1, the first term on the left, with an optimum smoothing filter matrix MB4, the second term on the left. The optimum first filter matrix MB1 for 133-line dot shown in FIG. 17 is applied to the first term on the left of the determinant of FIG. 21. The optimum smoothing filter matrix MB4 for 133-line dot shown in FIG. 21 is identical with the optimum smoothing filter matrix MA4 for 65-line dot shown in FIG. 19.

FIG. 22A graphically represents the optimum characteristic GB5 of the first filter for 133-line dot, which is the same as that shown in FIG. 18A. FIG. 22B graphically represents an optimum characteristic GB8 of the smoothing filter for 133-line dot. The optimum smoothing filter characteristic GB8 is defined by the smoothing filter matrix MB4 of FIG. 21. The optimum smoothing filter characteristic GB8 is identical with the smoothing filter characteristic GA8 shown in FIG. 20B.

FIG. 22C graphically represents an optimum characteristic GB9 of the spatial filter processing section 27 for 133-line dot. The optimum characteristic GB9 of the spatial filter processing section 27 is defined by the spatial filter matrix MB5 of FIG. 21. In the optimum characteristic GB9 of the spatial filter processing section 27, the MTF presents the minimum value at the spatial frequency of 9.2 lines/mm instead of the moire frequency FMB for 133-line dot and stays at 0 in the frequency band of 16 lines/mm and above. Except for this, the characteristic GB9 has the same configuration as the ideal characteristic GB1 of the spatial filter processing section 27 for 133-line dot shown in FIG. 9.

As described above, where the spatial filter matrix is defined by using the smoothing filter matrix with the filter coefficient for the target pixel having the greater value than those for the neighboring pixels, the spatial filter processing section 27 is imparted with a more suitable characteristic for the spatial filter process. There is the following reason for that it is more preferred to use the smoothing filter matrix wherein the filter coefficient for the target pixel has the greater value than those for the neighboring pixels. In the moire removal from the image, it is ideal to remove the moire as leaving the characteristics of the target pixel in the image in intact state. The characteristics of the target pixel include, for example, color difference from the neighboring pixels. If the filter coefficient for the target pixel is greater than those for the neighboring pixels, the smoothing filter can leave more of the characteristics of the target pixel as they are. Hence, the smoothing filter matrix is made such that the filter coefficient for the target pixel has the greater value than those for the neighboring pixels. In the smoothing filter matrix with the filter coefficient for the target pixel greater than those for the neighboring pixels, it is preferred that the filter coefficient for the neighboring pixel decreases as the neighboring pixel is more spaced from the target pixel. This permits the smoothing filter to leave even more of the characteristics of the target pixel as they are.

The description with reference to FIGS. 4–22 exemplifies the case where only one moire-frequency band is present in the dot area extracted by the image-area separation processing section 25. In fact, the dot area does not always include only one moire frequency but may include plural moire frequencies. Where the dot area includes plural moire frequencies, a preferred first filter matrix is obtained by cross-convolution of matrices (hereinafter referred to as "second filter matrix") each used for defining a characteristic of each filter (hereinafter referred to as "second filter") for attenuating or removing each of the moire frequency components. The second filter is preferably embodied in a band-cut filter wherein the MTF presents the minimum value at the moire frequency.

A characteristic GX1 of the spatial filter processing section 27 when the dot area contains plural moire frequencies is described with reference to FIG. 23. The following description exemplifies a case where spatial frequency characteristics of the dot area include three moire frequencies A1, A2, A3, as shown in FIG. 23A. As shown in FIG. 23B, the characteristic GX1 of the spatial filter processing section 27 essentially has an attenuating tendency which is suppressed at respective portions corresponding to the moire frequencies A1, A2, A3. Thus, the characteristic is made such that the reference MTF is at 1.0, that the MTF presents the minimum value at the respective moire frequencies FM1, FM2, FM3 of the three moire-frequency bands A1, A2, A3, and that the MTF is less than 1.0 in the overall allowable spatial frequency band.

Figure 23:
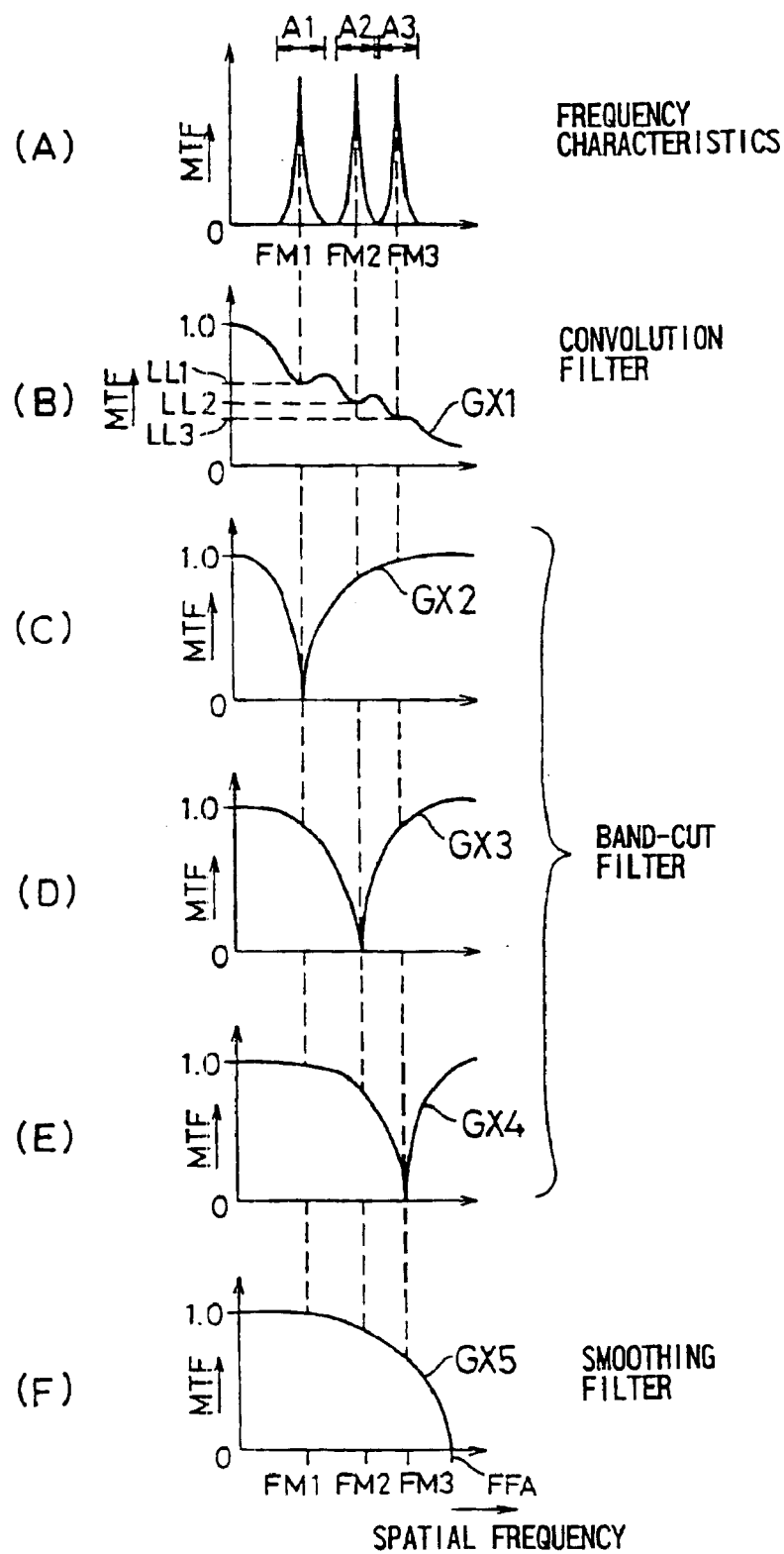
FIGS. 23A–23F are graphs each representing the characteristic of the spatial filter processing section when the dot area contains plural moire-causative spatial frequencies.

The matrix for defining the ideal characteristic GX1 of the spatial filter processing section 27 is obtained by convoluting matrices for defining characteristics GX2, GX3, GX4 of three second filters and a matrix for defining a smoothing filter characteristic. FIGS. 23C–23E are graphs representing the characteristics GX2, GX3, GX4 of the second filters, respectively. In the characteristics GX2, GX3, GX4 of the second filters, the reference MTF is at 1.0 and the MTF presents the minimum value at the respective moire frequencies FM1, FM2, FM3. In the three second filters, the MTF presents the minimum value at different spatial frequencies. FIG. 23F graphically represents a characteristic GX5 of the smoothing filter. The smoothing filter characteristic GX5 of FIG. 23F is identical with the smoothing filter characteristic used by the description with reference to FIGS. 4–22.

Where the dot area contains plural moire frequencies, the spatial filter processing section 27 performs the spatial filter process using the spatial filter matrix defining the characteristic of FIG. 23B. This permits the spatial filter processing section 27 to perform a preferred spatial filter process to the dot area. Although FIG. 23 shows three moire-frequency bands in the dot area, this should not limit the number of frequency bands. The dot area may contain at least one moire-frequency band.

Where the spatial filter processing section 27 is to process a color image, its image data may consist of luminance data and color difference data on each pixel. L*a*b*-base image data may be cited as an example of the image data wherein the luminance data and the color difference data are separate. The L*a*b* calorimetric system was standardized in 1976 by the Commission Internationale de l'Eclairage and is used as the standard color space in the printing industry. The L*a*b*-base image data represents the pixel by combination of lightness index L* and two types of chromaticnesses a*, b*. The lightness index L* is equivalent to the luminance data whereas the two chromaticnesses a*, b* are equivalent to the color difference data. In order to supply the L*a*b*-base image data to the spatial filter processing section 27, the image processor 14 may be arranged such that the color correcting section 24 includes a color conversion section which converts the RGB-base image data to the L*a*b*-base image data.

If the L*a*b*-base data is supplied, the spatial filter processing section 27 is preferred to process only the luminance data L* and to leave the color difference data a*, b* unprocessed. There is the following reason for this. The spatial filter process according to the embodiment converts the spatial frequency characteristics of the subject image to desired spatial frequency characteristics for the main purpose of improving the image quality. Where the image data consists of luminance data and color difference data on each pixel, the spatial filtering of the color difference data results in an image which is varied in color perceptibility from an image before the spatial filter process. The spatial filtering of the color difference data hinders the improvement of image quality and hence, is not acceptable. When supplied with the L*a*b*-base image data, the spatial filter processing section 27 processes only the luminance data L* indicative of pixel density and leaves unprocessed the color difference data a*, b* indicative of pixel color. Thus, the spatial filter processing section 27 is adapted to provide a favorable spatial filter process free from the fear of the image quality degradation, which accompanies the spatial filter process.

Figure 24:
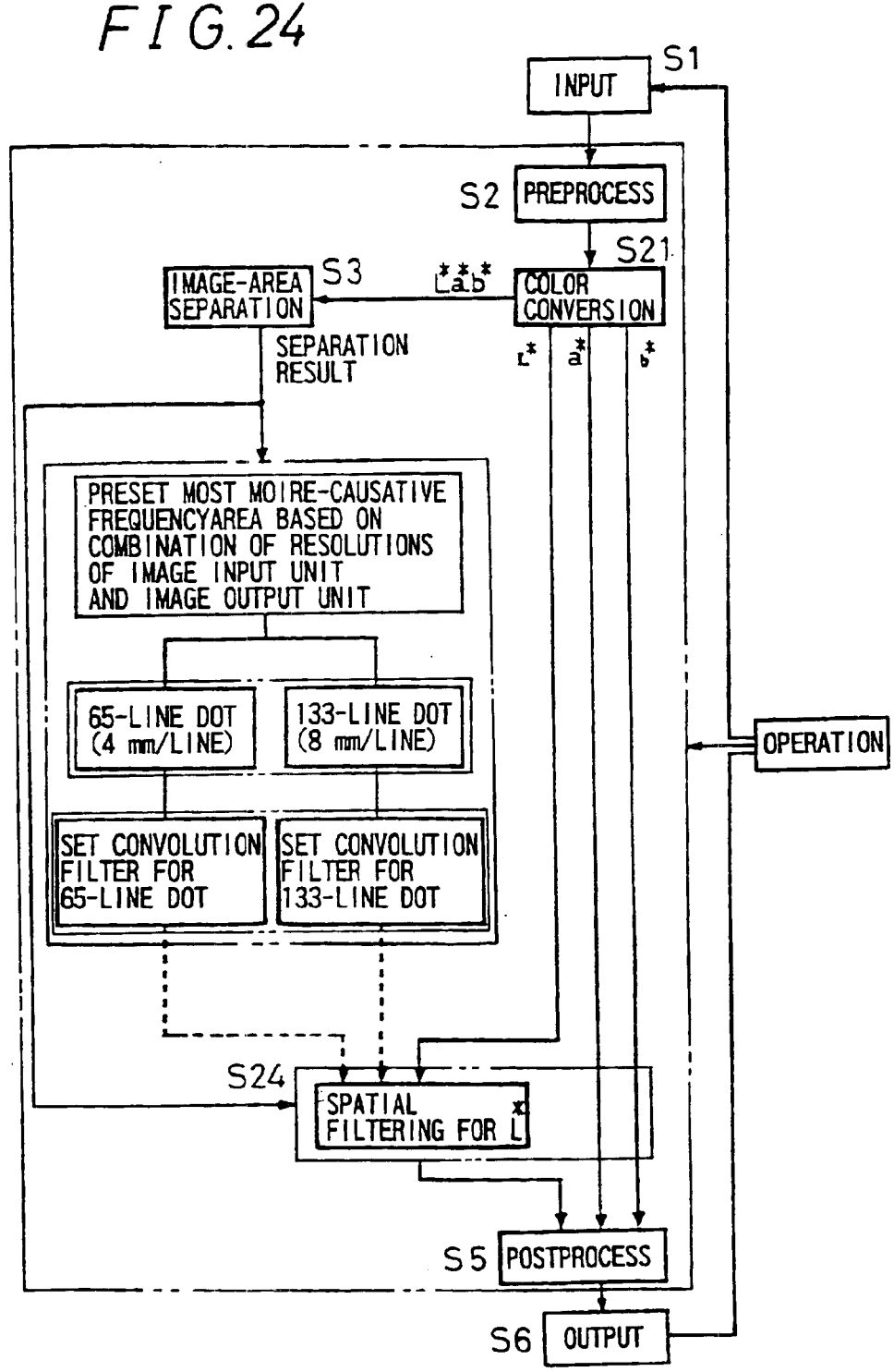
FIG. 24 is a block diagram illustrating a process performed by the image forming apparatus of FIG. 2 wherein L*a*b*-base image data is processed.

FIG. 24 is a block diagram illustrating a process of from image input to image output which is carried out in the image forming apparatus 11 of FIG. 2 when the spatial filter processing section 27 processes the L*a*b*-base image data. In FIG. 24, steps to perform the same operations as those in FIG. 3 are respectively represented by the same reference characters and the description thereof is dispensed with. After completion of the preprocess at Step S2, the color conversion section of the color correcting section 24 in the image processor 14 performs Step S21 to convert the preprocessed RGB-base image data to L*a*b*-base image data. The conversion between the L*a*b*-base image data and the RGB-base image data can be done by calculation.

The spatial filter processing section 27 of the image processor 14 performs Step S24 to spatially filter only the luminance data L* of the L*a*b*-base image data, using a spatial filter matrix. The spatial filter matrix used in Step S24 is obtained by convoluting the first filter matrix with the smoothing filter matrix similarly to the matrix described with reference to FIGS. 4–22. The color difference data a*, b* of the L*a*b*-base image data are left unprocessed and are directly supplied to the halftone output gradation processing section 28.

Where only the luminance data L* is spatially filtered, the spatial filter matrix used by the spatial filter processing section 27 varies depending upon the dot types. Therefore, the spatial filter matrix for 65-line dot or the spatial filter matrix for 133-line dot may be properly selected when only the luminance data L* is spatially filtered. The switching between the spatial filter matrices is done by the same operation described with reference to FIG. 13.

Where the spatial filter processing section 27 processes a color image, its image data may consist of plural color data pieces indicative of a color of each pixel, and black data indicative of a density of each pixel. This image data is exemplified by CMYK-base image data. The CMYK-base image data consists of data pieces obtained by separating each pixel datum into four colors of cyan (C), magenta (M), yellow (Y) and black (K).

Figure 25:
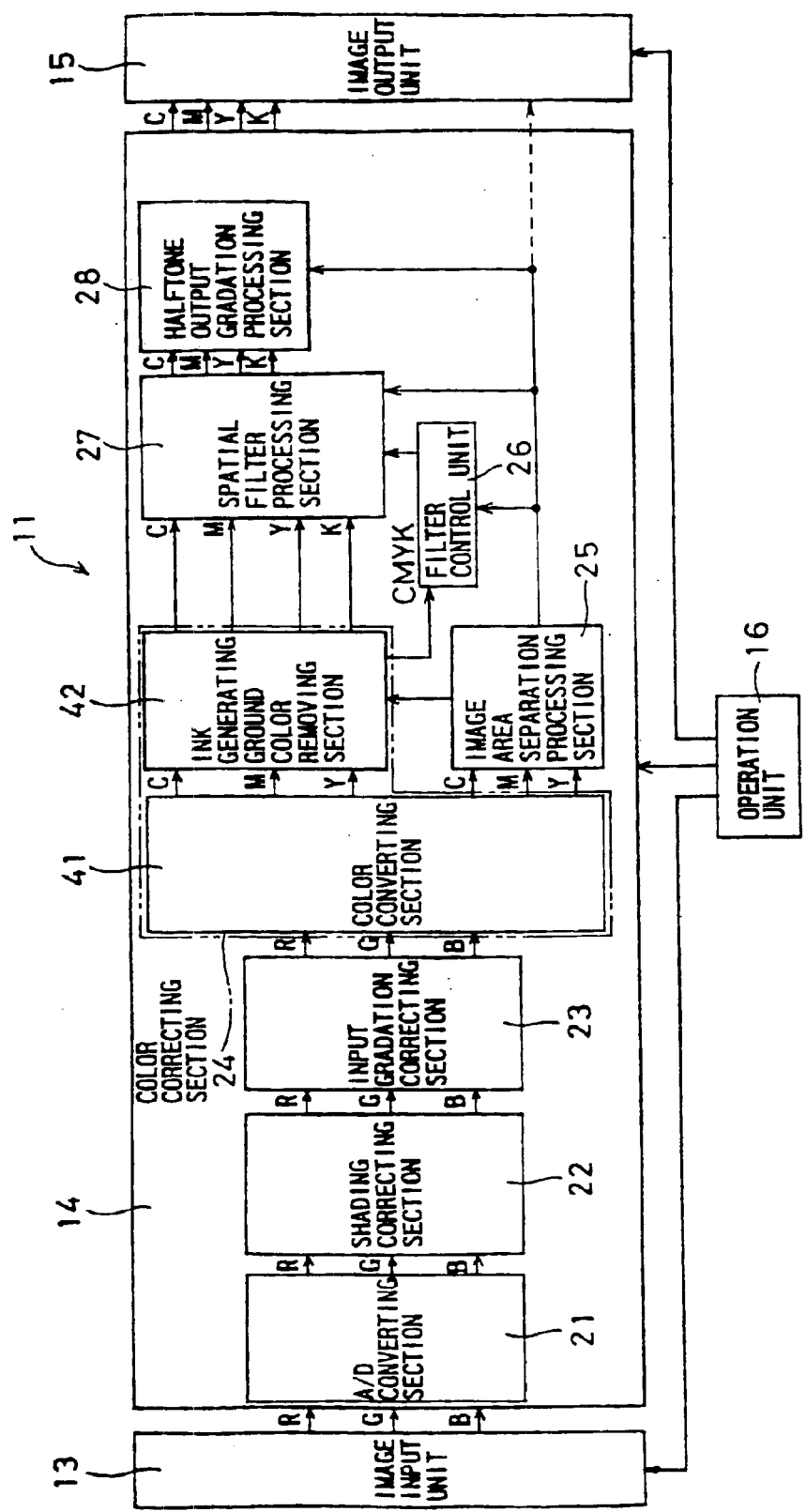
FIG. 25 is a block diagram showing a configuration of the image processor of FIG. 2 which processes CMYK-base image data.

FIG. 25 is a block diagram showing a configuration of the image processor 14 which processes an image represented by CMYK-base image data. In an example of FIG. 25, the color correcting section 24 includes a color conversion section 41 and a black generation/base-color removal section 42. The color conversion section 41 converts the RGB-base image data to the CMY-base image data. The black generation/base-color removal section 42 generates black data indicative of pixel density based on CMY-base image data, and then subjects the CMY-base image data to a base-color removal process. Thus, the RGB-base image data is converted to the CMYK-base image data, which is supplied to the spatial filter processing section 27. When supplied with the CMYK-base image data, the spatial filter processing section 27 applies the spatial filter process to each of the CMYK color data pieces. A spatial filter matrix used in the spatial filtering of each of the CMYK data pieces is obtained by convoluting the first filter matrix with the smoothing filter matrix the same way as in the explanation with reference to FIGS. 4–22. When supplied with the CMYK-base image data, the spatial filter processing section 27 may be adapted to spatially filter only the black data indicative of pixel density and to output the respective CMY data pieces indicative of image color as they are. This permits the spatial filter processing section 27 to accomplish a sufficient moire removal and prevention of the image color change.

The image processor 14 of the first embodiment may be used alone or in combination only with the image input unit 13 or only with the image output unit 15. The image processor 14 of the first embodiment may at least include the spatial filter processing section 27 and the image-area separation processing section 25, and may omit any of the other processing units depending on cases. The image output unit 15 is embodied in, for example, a display unit employing a cathode-ray tube or a liquid crystal display unit in a case where the image processor 14 outputs the RGB-base image data. On the other hand, the image output unit 15 is embodied in, for example, an electrophotographic printing apparatus or an ink-jet printing apparatus in a case where the image processor 14 outputs the CMYK-base image data. The image forming apparatus 11 is embodied in a copier where the image processor 14 outputs the CMYK-base image data. The image forming apparatus 1 of FIG. 1 is a mere example of the image forming apparatus of the invention so that a specific configuration thereof is not limited to that shown in FIG. 1. The first embodiment cited the 65-line dot and 133-line dot as examples of the dot types, based on which the spatial filter characteristic is defined. However, the first embodiment should not be limited to the above and the spatial filter characteristic may be defined based on other dot types, such as 100-line dot, 150-line dot and the like.

Figure 26:
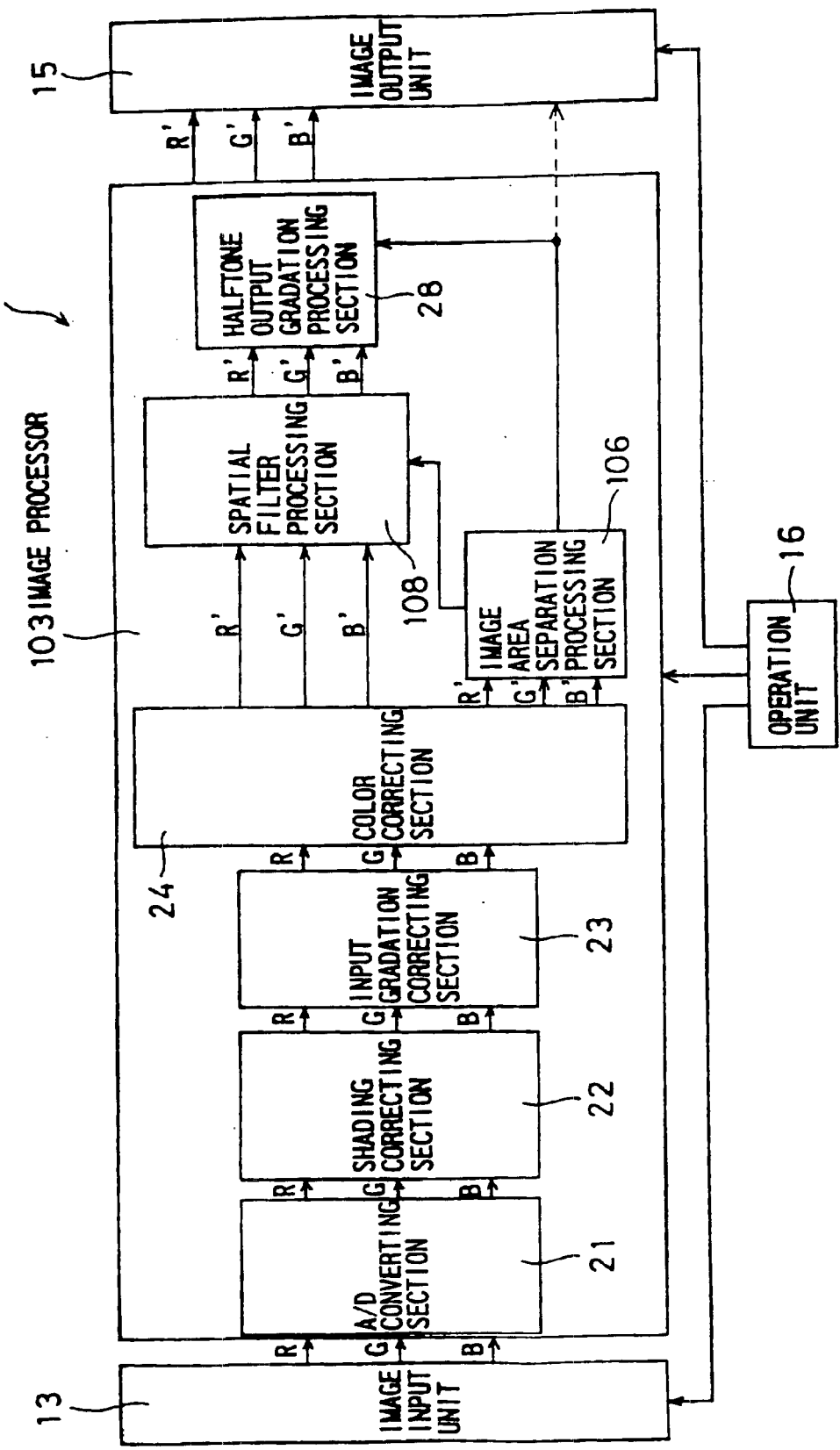
FIG. 26 is a block diagram showing a configuration of an image forming apparatus with an image processor according to a second embodiment hereof.

FIG. 26 is a block diagram showing a configuration of an image forming apparatus 101 including an image processor 103 according to a second embodiment of the invention. The image forming apparatus 101 of the second embodiment differs from the image forming apparatus 11 of the first embodiment in portions to be described hereinbelow. Accordingly, portions which are not described are configured the same way as in the first embodiment. The description of the image forming apparatus 101 of the second embodiment omits the portions which are of the same configuration and respectively represented by the same reference characters as in the image forming apparatus 11 of the first embodiment.

Besides the image processor 103, the image forming apparatus 101 further includes the image input unit 13, the image output unit 15 and the operation unit 16. The image processor 103 includes the A/D converting section 21, the shading correcting section 22, the input gradation correcting section 23, the color correcting section 24, an image-area separation processing section 106, a spatial filter processing section 108 and the halftone output gradation processing section 28.

The image-area separation processing section 106 extracts an edge in an image based on preprocessed image data. The edge extraction is implemented by a process using Sobel filter, for example. Hereinafter, a pixel constituting the edge is referred to as "edge pixel" whereas a sub-image area solely consisting of edge pixels is referred to as "edge area". An edge extraction result is supplied to the spatial filter processing section 108 and the halftone output gradation processing section 28. That is, the image-area separation processing section 106 is equivalent to the edge extraction means for extracting an edge in the image. The spatial filter processing section 108 spatially filters preprocessed image data. The spatial filter processing section 108 will be described later in detail.

Figure 27:
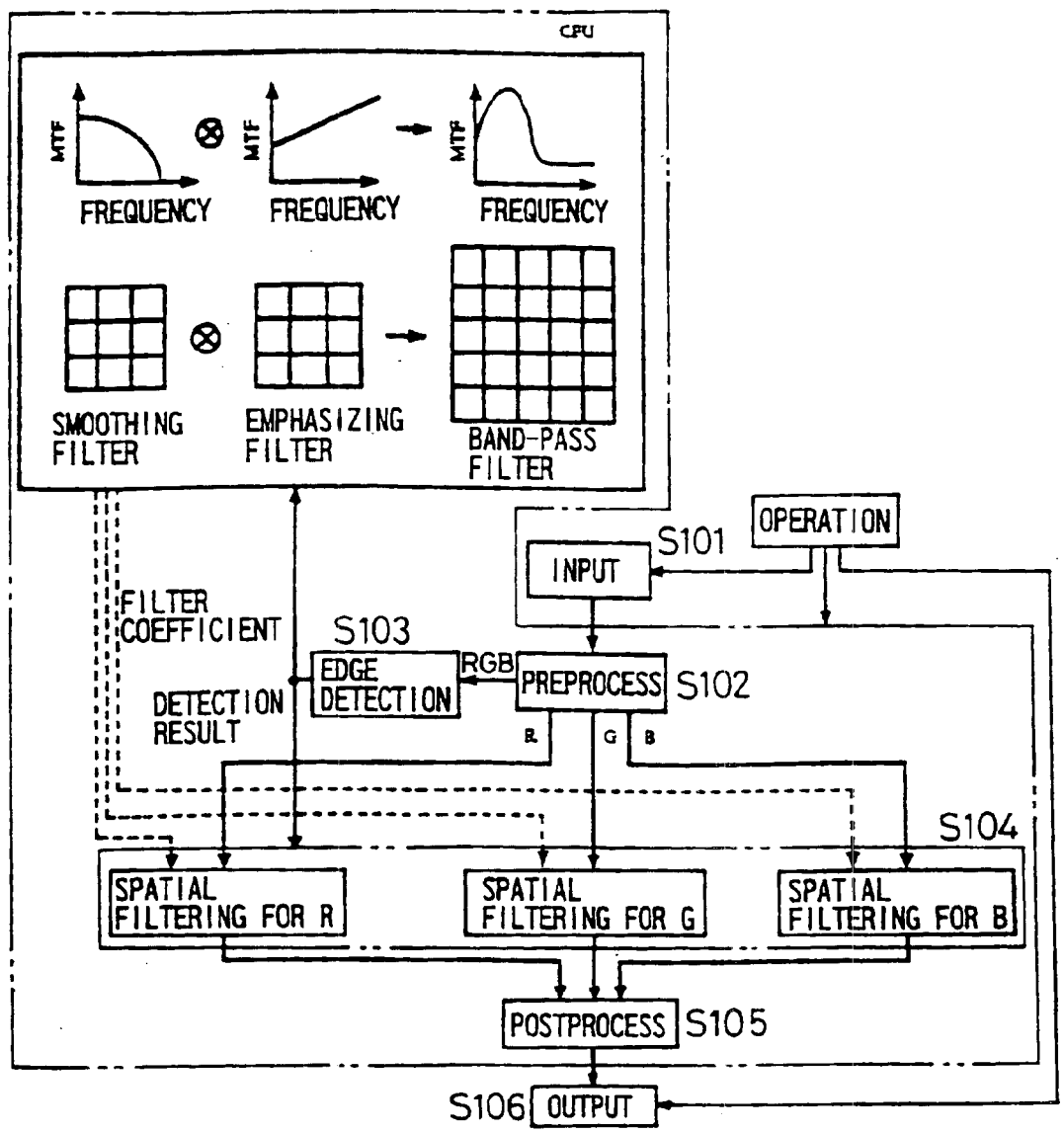
FIG. 27 is a block diagram illustrating a process performed by the image forming apparatus of FIG. 26 wherein RGB-base image data is processed.

FIG. 27 is a block diagram illustrating a process of from image input to image output which is carried out in the image forming apparatus 101 of FIG. 26. When the operator manipulates the operation unit 16 to produce copy of the original, the image input unit 13 performs Step S101, corresponding to Step S1, to read the original and to supply the image processor 103 with read data. In the image processor 103, the units of from the A/D converting section 21 to the color correcting section 24 are involved in the preprocess at Step S102 which includes A/D conversion, shading correction, input gradation correction and the like. The image-area separation processing section 106 performs Step S103 for edge extraction.

The spatial filter processing section 108 performs Step S104 to perform a spatial filter process for edge emphasis to a portion (hereinafter referred to as "edge portion") of the preprocessed image data, the edge portion corresponding to the edge area. The spatial filter processing section 108 may directly output the other portion of the image data than the edge area, performing no spatial filter process thereto. Otherwise, the spatial filter processing section may output the other image-data portion after performing thereto the spatial filter process based on spatial frequency characteristics thereof. The spatial filter process is discretely applied to respective RGB-pixel data pieces constituting the image data. The halftone output gradation processing section 2B performs Step S105 to postprocess the spatially filtered image data and then provides an output to the image output unit 15. The image output unit 15, in turn, performs Step S106 to output an image based on the postprocessed image data.

The image processor 103 of the second embodiment is characterized by the spatial filter process for edge emphasis performed by the spatial filter processing section 108. A characteristic of the spatial filter processing section 108 of the image processor 103 is described in detail as below. It is noted that the following description is on assumption that the spatial filter processing section 108 has the same characteristic in the discrete spatial filter processings for the respective RGB data pieces.

In the spatial filter process for edge emphasis, the spatial filter processing section 108 has the characteristic which is flat in a spatial frequency band (hereinafter referred to as "erroneous-judgment frequency band") containing a spatial frequency causative of an edge extraction error of the image-area separation processing section 106 and which emphasizes spatial frequency components in a spatial frequency band below a lower limit of the erroneous-judgment frequency band. The spatial filter processing section 108 with such a characteristic is equivalent to the edge-emphasizing spatial filter means.

In the following description, the allowable spatial frequency band containing the entirety of the spatial frequency components to be contained in the image is divided into three bands of an extractable band WZ1, an erroneous-judgment frequency band WZ2 and an unextractable band WZ3. The erroneous-judgment frequency band WZ2 contains density-pattern spatial frequencies liable to cause the edge extraction error of an edge extraction section of the image-area separation processing section 106. The extractable band WZ1 ranges down from the lower limit of the erroneous-judgment frequency band WZ2, solely containing density-pattern spatial frequencies which permit a positive edge extraction of the edge extraction section of the image-area separation processing section 106. The unextractable band WZ3 ranges up from an upper limit of the erroneous-judgment frequency band, solely containing density-pattern spatial frequencies disabling the edge extraction section of the image-area separation processing section 106 to accomplish the edge extraction. The spatial frequencies in the extractable band WZ1, erroneous-judgment frequency band WZ2 and unextractable band WZ3 monotonously increase in this order.

Figure 28:
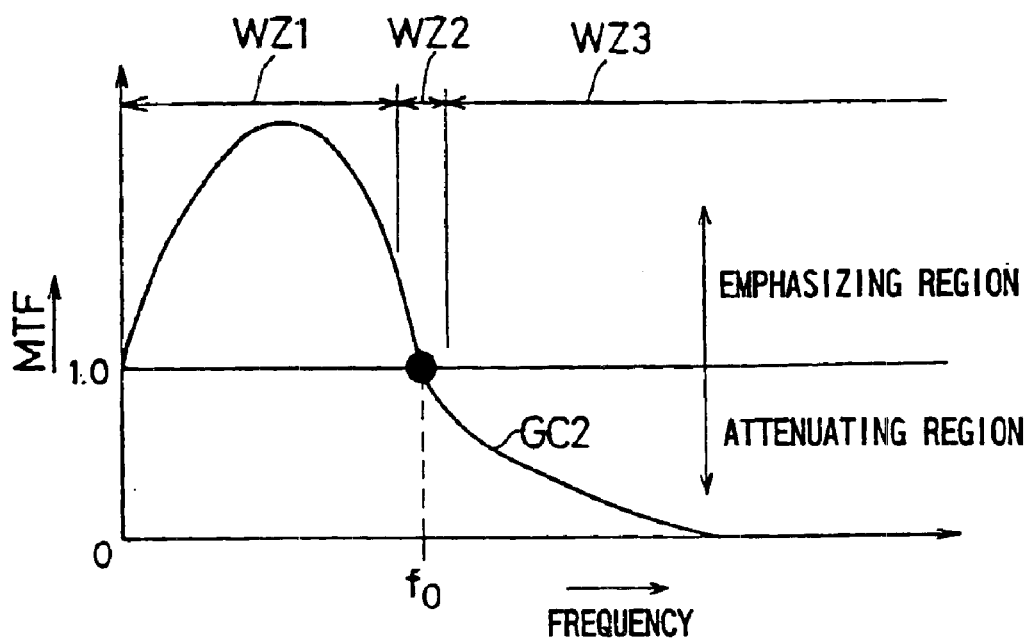
FIG. 28 is a graph representing an ideal characteristic of an edge-emphasizing spatial filter processing section.

FIG. 28 graphically represents an ideal characteristic GC2 of the spatial filter processing section 108. The ideal characteristic GC2 of the spatial filter processing section 108 may be defined such that the MTF presents values of not less than 1.0 for the spatial frequencies in the extractable band WZ1 and values of about 1.0 for the spatial frequencies in the erroneous-judgment band WZ2. The characteristic of the spatial filter processing section 108 is an attenuating tendency when the MTF value is less than 1.0, and is flat when the MTF value is about 1.0. The characteristic is an emphasizing tendency when the MTF value exceeds 1.0. When the MTF value is about 1.0, the spatial filter processing section 108 does not emphasize nor attenuate the spatial frequency components so that the spatial frequency components are maintained as they are. In the unextractable band WZ3, the ideal characteristic GC2 of the spatial filter processing section 108 may amplify the spatial frequency components, or may be flat, or attenuate the spatial frequency components.

Where the spatial filter processing section 108 is embodied in a digital filter, the characteristic thereof is defined by a matrix. The matrix for defining the characteristic of the spatial filter processing section 108 for edge emphasis is obtained by convoluting a matrix for defining an emphasizing filter characteristic and a matrix for defining a smoothing filter characteristic. An ideal emphasizing filter characteristic amplifies the entirety of the spatial frequency components in the allowable spatial frequency band. An ideal smoothing filter characteristic attenuates the entirety of the spatial frequency components in the allowable frequency band. Hereinafter, the matrix for defining the characteristic of the edge-emphasizing spatial filter processing section 108 will be referred to as "spatial filter matrix", the matrix for defining the emphasizing filter characteristic as "emphasizing filter matrix", and the matrix for defining the smoothing filter characteristic as "smoothing filter matrix".

The matrix given by convoluting the emphasizing filter matrix and the smoothing filter matrix is a matrix for defining a characteristic of a band-pass filter. This embodiment is implemented by a band-pass filter, the characteristic of which is defined by a 5×5 spatial filter matrix, as shown in FIG. 29B, while the smoothing filter matrix and the emphasizing filter matrix are each embodied in a 3×3 matrix, as shown in FIG. 29A. Where the characteristic GC2 of the spatial filter processing section 108 is embodied in the characteristic of the band-pass filter, a spatial frequency on a boundary between a spatial frequency band with components to be emphasized and a spatial frequency band with components to be attenuated will be defined as "representative frequency f0" in the following explanation. The representative frequency f0 is an arbitrary spatial frequency in the erroneous-judgment frequency band WZ2. It is noted that the characteristic of the spatial filter processing section 108 is not limited to that of the band-pass filter but may be implemented by any other filter that has the characteristic which is flat in the erroneous-judgment frequency band and emphasizes the spatial frequency components below the lower limit of the erroneous-judgment frequency band.

The characteristic of the edge-emphasizing spatial filter processing section 108 practically varies according to the variations in the input resolution of the image input unit 13 and in the extraction precision of the edge extraction section of the image-area separation processing section 106. Accordingly, the practical characteristic of the spatial filter processing section 108 is optimized by a test taking the procedure mentioned in the first embodiment. The optimization procedure for the characteristic of the spatial filter processing section 108 of the second embodiment is the same as that of the first embodiment except that the evaluation is made based on the density variations due to edge emphasis rather than moire. Where the practical filter characteristic does not coincide with the ideal characteristic, the same optimization procedure as in the first embodiment is taken.

FIG. 30 is a diagram showing a determinant for defining an optimum spatial filter matrix MC3. The determinant of FIG. 30 exemplifies a case where the representative frequency f0 is at 6.5 lines/mm. In the determinant of FIG. 30, the first term on the left represents an optimum smoothing filter matrix MC1 which is identical with the optimum smoothing filter matrix MA4 of FIG. 20. The second term on the left in FIG. 30 represents an optimum emphasizing filter matrix MC2. The term on the right in FIG. 30 represents the optimum spatial filter matrix MC3 which is obtained by convoluting the optimum smoothing filter matrix MC1 with the optimum emphasizing filter matrix MC2.

Figure 31:
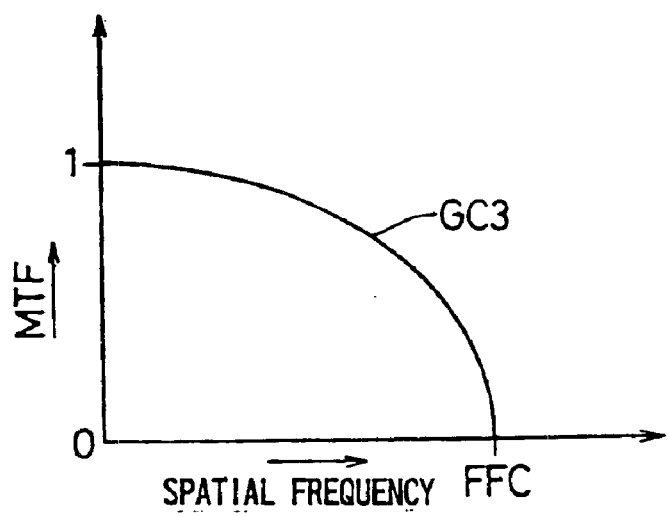
FIG. 31 is a graph representing a characteristic of a smoothing filter for defining an optimum characteristic of a edge-emphasizing spatial filter processing section.

FIG. 31 graphically represents an optimum smoothing filter characteristic GC3. The optimum smoothing filter characteristic GC3 of FIG. 31 is defined by the optimum smoothing filter matrix MC1 of FIG. 30. In the optimum smoothing filter characteristic GC3, the reference MTF is at 1.0 while the MTF approaches 0 with increase in the spatial frequency in a frequency band of more than 0 and less than a predetermined upper-limit spatial frequency FFC, and stays at 0 in a frequency band above the upper-limit spatial frequency FFC. The upper-limit spatial frequency FFC is higher than the representative frequency f0.

Figure 32:
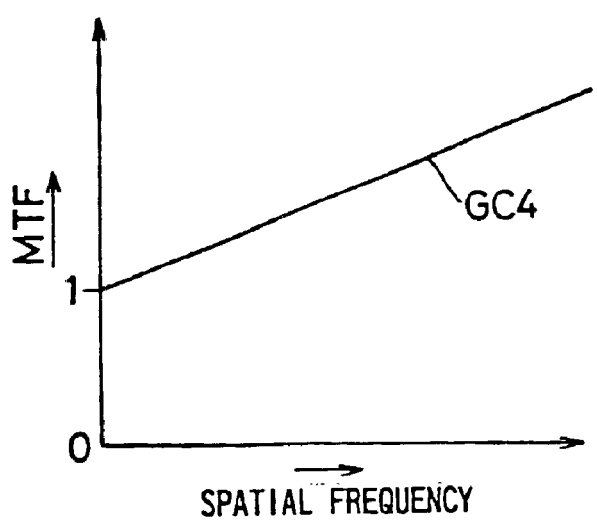
FIG. 32 is a graph representing a characteristic of an emphasizing filter for defining the optimum characteristic of the edge-emphasizing spatial filter processing section.

FIG. 32 graphically represents an optimum emphasizing filter characteristic GC4. The optimum emphasizing filter characteristic GC4 of FIG. 32 is defined by the optimum emphasizing filter matrix MC2 of FIG. 30. In the optimum emphasizing filter characteristic GC4, the reference MTF is at 1.0 while the MTF increases with increase in the spatial frequency.

As seen in the graph of FIG. 28, the characteristic of the spatial filter processing section 108 defined by the optimum spatial filter matrix MC3 of FIG. 30 is such that the MTF is more than 1.0 in the spatial frequency band below the representative frequency f0, equal to 1.0 at the representative frequency f0, and less than 1.0 in the spatial frequency band above the representative frequency f0. In this case, the representative frequency f0 is at 6.5 lines/mm. As a result, the spatial filter processing section 108 is adapted to process the edge area of the image in a manner that the spatial frequency components in the extractable band WZ1 are sufficiently increased; the spatial frequency components in the erroneous-judgment band WZ2 are maintained as they are; and the spatial frequency components in the unextractable band WZ3 are maintained as they are or sufficiently attenuated. This results in an adequate suppression of the density variations of the filtered image.

The reason for defining the characteristic of the spatial filter processing section 108 as that of FIG. 28 will hereinbelow be explained by way of an example of an image shown in FIG. 33 processed by the image forming apparatus 101.

The precision of the edge extraction section of the image-area separation processing section 106 depends upon the input resolution of the image input unit 13. It is quite difficult to divide the allowable spatial frequency band into a band containing density-pattern spatial frequencies to be distinctly read by the image input unit 13 and a band containing density-pattern spatial frequencies absolutely unreadable for the image input unit 13. A density pattern of frequencies at and about the input resolution may be distinctly read or not depending on cases. As a result, the image data may include a noise component causative of color shift or color turbidity.

The above phenomenon will be explained by way of an example of a test using an original formed with an experimental density pattern shown in FIG. 33. The experimental density pattern is formed by arranging plural line portions of different widths in parallel relation. In the experimental density pattern, the widths of the plural line portions progressively decrease from the left toward the right of the drawing. The respective widths of the line portions in a left-end part 113 are the inverse of the spatial frequencies of the extractable band WZ1, whereas the respective widths of the line portions in a middle part 112 are the inverse of the spatial frequencies of the erroneous-judgment frequency band WZ2. In FIG. 33, a diagonally upwardly shaded area of each line portion is solidly filled by the same color as its contour line.

Figure 33:
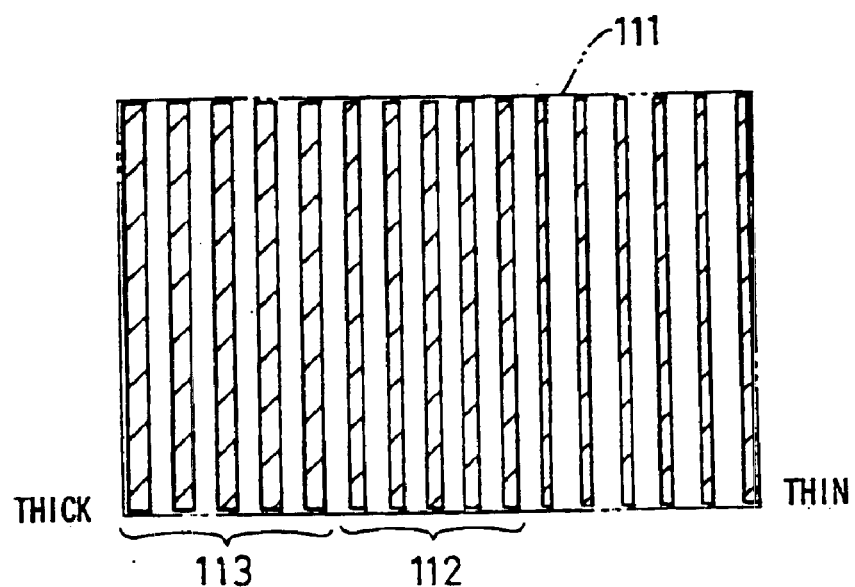
FIG. 33 is a diagram showing an experimental image for edge emphasizing process.
Figure 34:
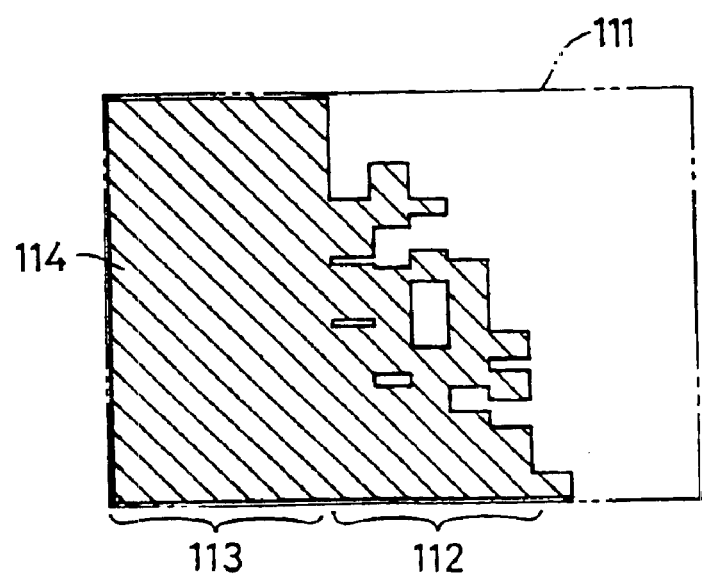
FIG. 34 is a diagram showing results of an edge extraction process applied to the image of FIG. 33.

The test using the image of FIG. 33 takes a procedure wherein the image input unit 13 first reads the image of FIG. 33, and then the edge extraction section of the image-area separation processing section 106 extracts edges in the image based on image data acquired by reading the image. The results of the test are shown in FIG. 34 which represents a distribution of edge pixels in the image extracted by the edge extraction section of the image-area separation processing section 106. In FIG. 34, a frame line 111 defines a region in which the line portions of FIG. 33 are drawn, whereas a diagonally downwardly shaded portion represents an edge area 114. A comparison between FIG. 33 and FIG. 34 shows that, in the experimental pattern, some of the pixels forming the line portions in the middle part 112 are determined to be the edge pixel while the others are not. Briefly, the test reveals that the edge extraction section of the image-area separation processing section 106 has erroneously extracted edges of the line portions in the middle part 112.

Assume that the prior-art spatial filter for edge emphasis applies the edge emphasizing process to the image data of FIG. 33 based on the edge extraction results shown in FIG. 34. FIG. 35 shows an image subjected to the edge emphasizing process of the prior art. In FIG. 35, a diagonally downwardly shaded portion shows a portion emphasized by the edge emphasizing process, whereas a diagonally upwardly shaded portion shows an unemphasized portion. FIG. 35 shows that when the prior-art edge emphasizing process is applied, the sub-image portion containing the spatial frequency components of the erroneous-judgment band WZ2, or the line portions in the middle part 112 are locally emphasized. This results in density variations of the line portions in the middle part 112 and hence, the image of FIG. 35 has a lower quality than the image of FIG. 33.

Assume that the spatial filter processing section 108 of this embodiment applies the edge emphasizing process to the data on the image of FIG. 33, using the extraction results shown in FIG. 34. FIG. 36 shows an image subjected to the edge emphasizing process of the embodiment. In FIG. 36, a diagonally downwardly shaded portion shows a portion emphasized by this edge emphasizing process, whereas a diagonally upwardly shaded portion shows an unemphasized portion. FIG. 36 shows that when the spatial filter processing section 108 of the embodiment is used, only the sub-image portion containing the spatial frequencies of the extractable band WZ1, or the line portions in the left-end part 113 are emphasized while all the line portions in the middle part 112 are not emphasized.

The spatial filter processing section 108 of the embodiment is capable of preventing the emphasis of the density-pattern edges of the spatial frequencies in the erroneous-judgment frequency band WZ2 and of providing a positive emphasis only of the density-pattern edges of the spatial frequencies in the extractable band WZ1. This suppresses the density variations due to the erroneous edge extraction and hence, the image quality degradation is obviated. For the above reason, the spatial filter processing section 108 is preferred to have the characteristic GC2 of FIG. 28. The spatial filter processing section 108 is adapted to perform a favorable edge emphasizing process to an image at a time without the need for a cumbersome operation to change its characteristic according to the variations in the spatial frequency component.

As described above, the image forming apparatus 103 employs a single spatial filter for the edge emphasizing process, the filter having the characteristic of smoothing the erroneous-judgment frequency band WZ2 while emphasizing the extractable frequency band WZ1. This facilitates the processing done by the spatial filter processing section 108 so that the overall processing time of the image forming apparatus 101 is reduced. Additionally, the spatial filter processing section 108 is adjusted for the characteristic thereof so as to present a flat characteristic line initially for the erroneous-judgment frequency band WZ2, thus adapted to provide an even more favorable edge emphasizing process.

The erroneous-judgment frequency band WZ2 and the representative frequency f0 can be determined by the test using the original shown in FIG. 33. Firstly, the original of FIG. 33 is copied by the image forming apparatus 101 wherein the characteristic of the spatial filter processing section 108 is defined as that for the prior-art edge emphasizing process. Subsequently, an output image is checked to find a density-varied portion due to the erroneous edge judgment, thereby to determine a frequency band with density-pattern spatial frequencies of the so found portion to be the erroneous-judgment frequency band WZ2. Then, any one of the spatial frequencies in the erroneous-judgment band WZ2 thus determined is selected as the representative frequency f0. The representative frequency is, for example, amean value of an upper-limit spatial frequency and a lower-limit spatial frequency of the erroneous-judgment band WZ2. Specifically, where the erroneous-judgment band WZ2 is in the range of 12 lines/mm to 14 lines/mm, a spatial frequency at the middle of the band, 13 lines/mm may be determined to be the representative frequency f0.

The spatial filter processing section 108 of the embodiment discretely applies the edge emphasizing process to the respective RGB data pieces, using the spatial filter matrix. An image resulting from such an edge emphasizing process features high image quality because the density variations uniformly appear in the overall image and the edges are favorably emphasized.

In order to even further increase the edge emphasis effect, each process for each color data piece uses a spatial filter matrix, the emphasis degree of which is defined according to a characteristic of each color data piece. Since the spatial filter matrix is given by convoluting the smoothing filter matrix and the emphasizing filter matrix, the spatial filter matrix may be varied in the emphasis degree by varying the emphasis degree of the emphasizing filter matrix. If the emphasizing filter matrix with the emphasis degree defined based on the characteristic of each of the RGB color data pieces is convoluted with the smoothing filter matrix, the resultant spatial filter matrix reflects each of the RGB data pieces.

Figure 37:
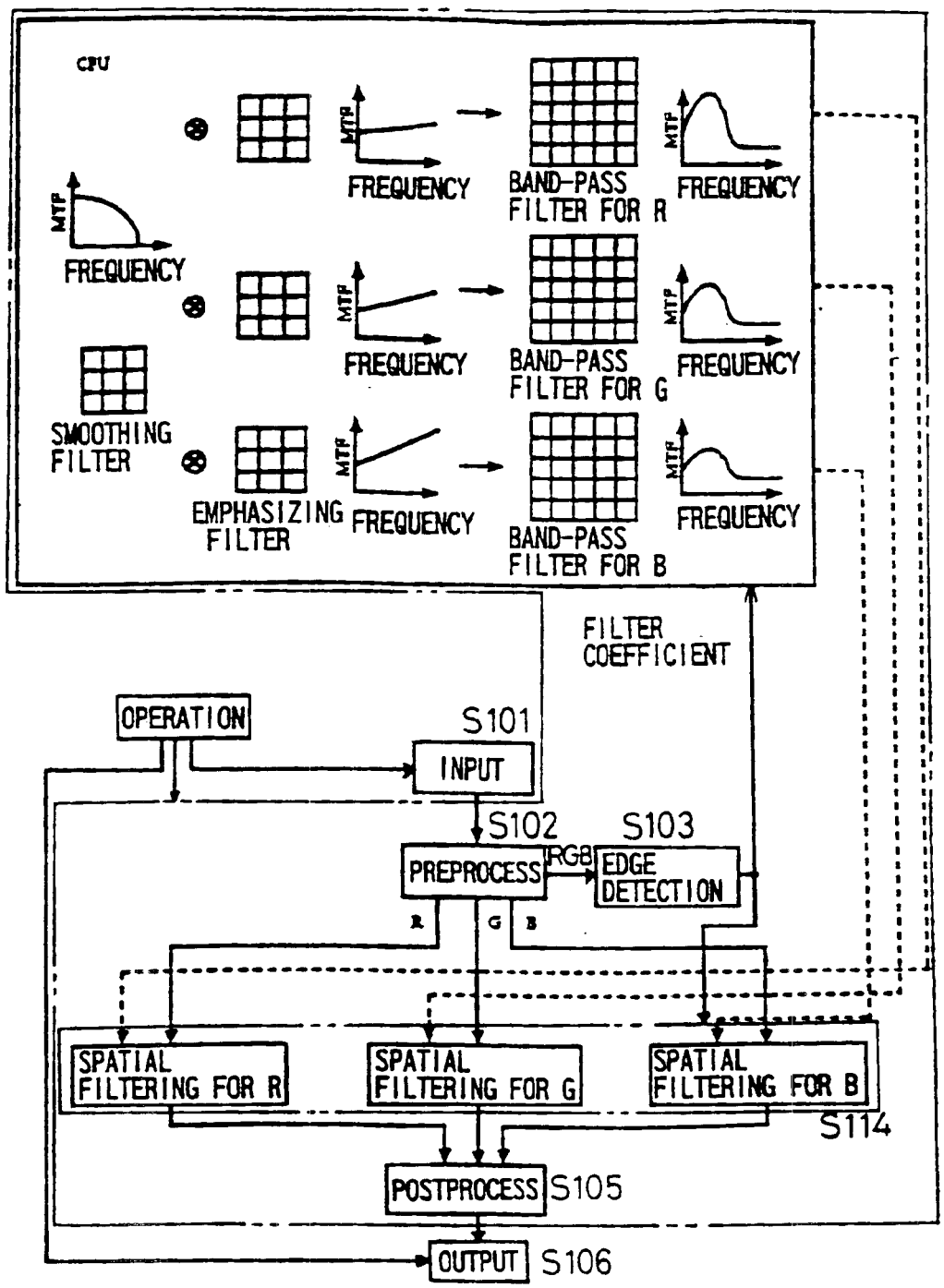
FIG. 37 is a diagram illustrating a process performed by the image forming apparatus of FIG. 26 wherein spatial filter matrices are discretely defined for respective RGB data pieces on pixel.

FIG. 37 is a diagram illustrating a process of from image input to image output which is carried out in the image forming apparatus 101 wherein discrete spatial filter matrices are defined for the respective spatial filtering of the color data pieces. In the following explanation with reference to the figure illustrative of the process done by the image forming apparatus, the steps indicative of the same operations as in FIG. 27 are represented by the same reference characters, respectively, and the description thereof is dispensed with. In the process of FIG. 37, a spatial filter matrix for red (R), a spatial filter matrix for blue (B) and a spatial filter matrix for green (G) are discretely defined in advance. After image data is preprocessed in Step S102, the spatial filter processing section 108 performs Step S114 to spatially filter red data using the spatial filter matrix for red, green data using the spatial filter matrix for green and blue data using the spatial filter matrix for blue. In Step S114, image data consisting of the spatially filtered RGB data pieces is supplied to the halftone output gradation correcting section 28. As the effect of the above processings, the spatial filter processing section 108 is adapted to perform an even more favorable edge emphasizing process to the image and hence, the problems such as image nonuniformity, image quality degradation and the like are obviated.

In the edge emphasis, any one of the red, green and blue is desired to be emphasized in some case. In this case, it is only required to change the emphasis degree of a spatial filter matrix used for processing the one of the color data pieces if the spatial filter matrices are discretely defined for the respective spatial filter processes of the color data pieces. In this manner, an even more favorable edge emphasizing process can be applied to the image.

Where the spatial filter processing section 108 processes a color image, its image data may consist of luminance data and color difference data on each pixel. Explanation is given by way of an example of a case where L*a*b*-base image data is processed. In order to supply the L*a*b*-base image data to the spatial filter processing section 108 of the image processor 103, the color correcting section 24 may include the color conversion section for converting the RGB-base image data to the L*a*b*-base image data. When supplied with the L*a*b*-base image data, the spatial filter processing section 108 is preferred to process only the luminance data L* but to leave the color difference data a*, b* unprocessed. The same reason as in the first embodiment with reference to FIG. 23 is given for this.

Figure 38:
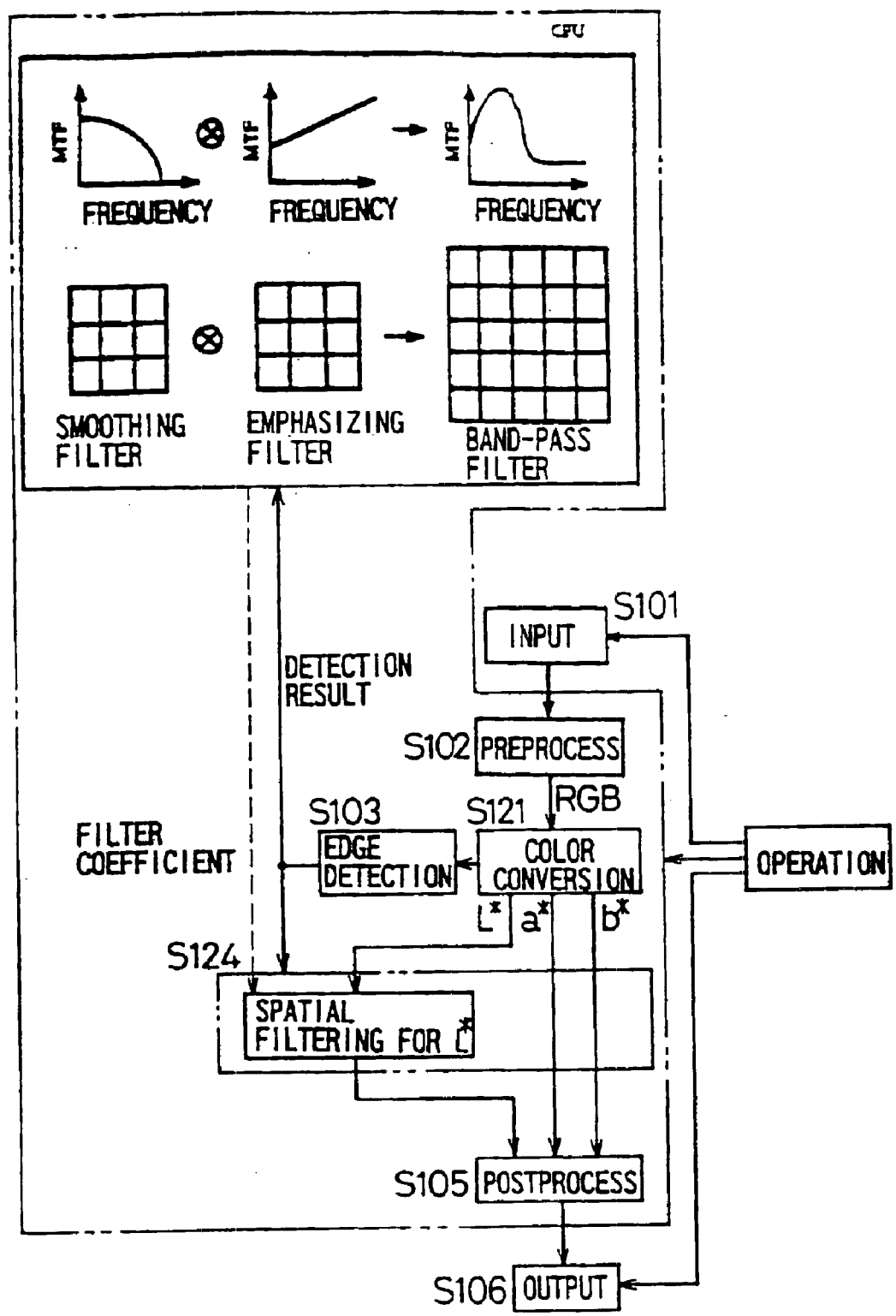
FIG. 38 is a diagram illustrating a process performed by the image processor of FIG. 26 wherein L*a*b*-base image data is processed.

FIG. 38 is a diagram illustrating a process of from image input to image output which is carried out in the image forming apparatus 101 wherein the image processor 108 processes the L*a*b*-base image data. After completion of the preprocess at Step S102, the color conversion section of the color correcting section 24 of the image processor 103 performs Step S121 to covert the preprocessed RGB-base image data to L*a*b*-base image data.

Figure 39:
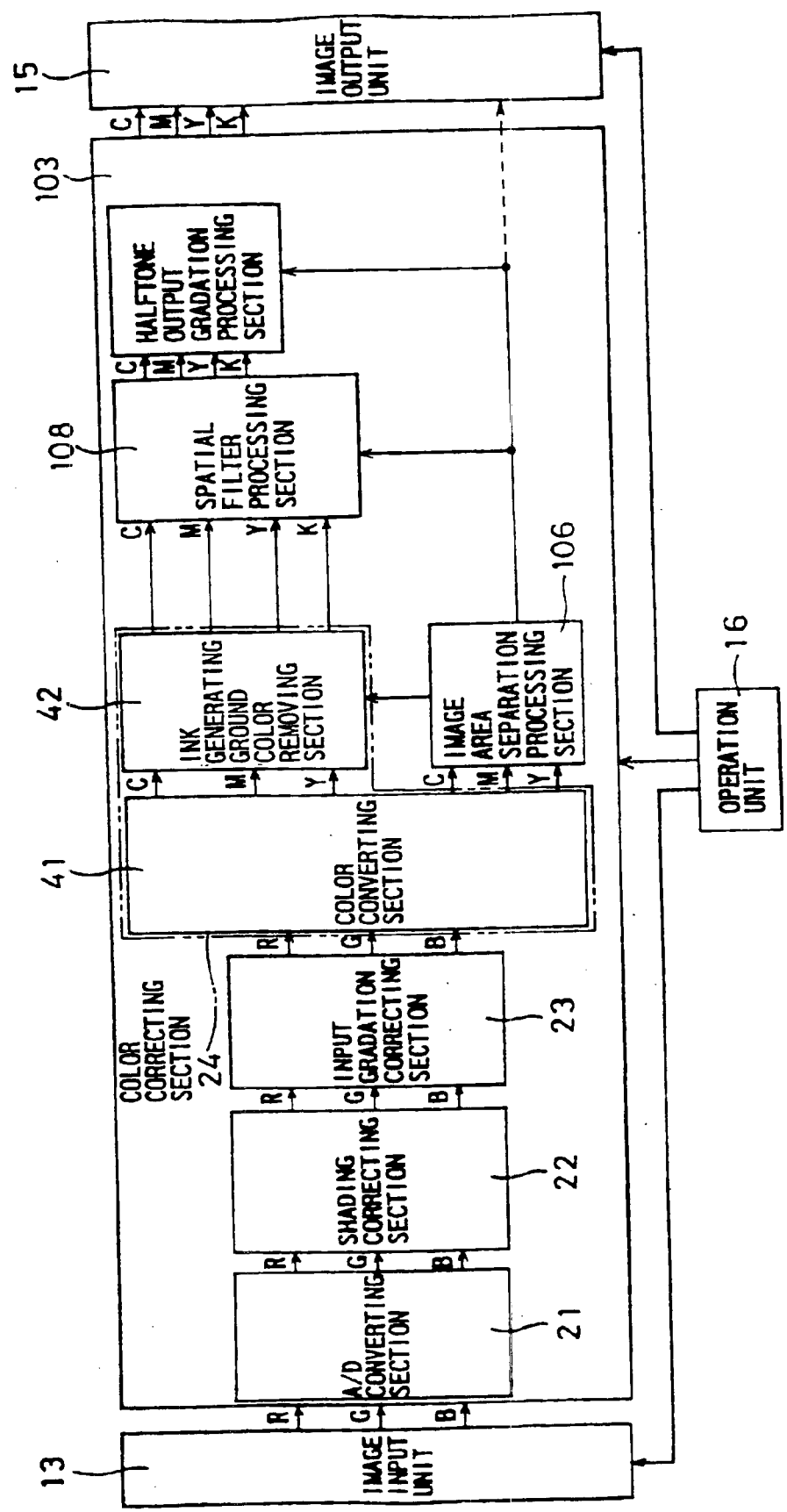
FIG. 39 is a block diagram showing a configuration of the image processor of FIG. 26 wherein CMYK-base image data is processed.

The spatial filter processing section 108 performs Step S124 to perform the spatial filter process only to the luminance data L* of the L*a*b*-base image data, using a spatial filter matrix. The spatial filter matrix used for spatially filtering the luminance data L* is given by convoluting an emphasizing filter matrix and a smoothing filter matrix, just as explained with reference to FIGS. 28–32. The color difference data a*, b*, on the other hand, is supplied to the halftone output gradation processing section 108 without receiving the spatial filter process. In this manner, the spatial filter processing section 108 can prevent the image quality degradation of the spatially filtered image while suppressing the occurrence of density variations due to the erroneous edge extraction. 119.

Where the spatial filter processing section 108 processes a color image, its image data may consist of data indicating the color of each pixel and black data indicating the density of each pixel. FIG. 39 is a block diagram showing a configuration of the image processor 103 which processes CMYK-base image data. In the example of FIG. 39, the color correcting section 24 includes the color conversion section 41 and the black generation/base-color removal section 42, similarly to the example of FIG. 25. This permits the CMYK-base image data to be supplied to the spatial filter processing section 108.

Figure 40:
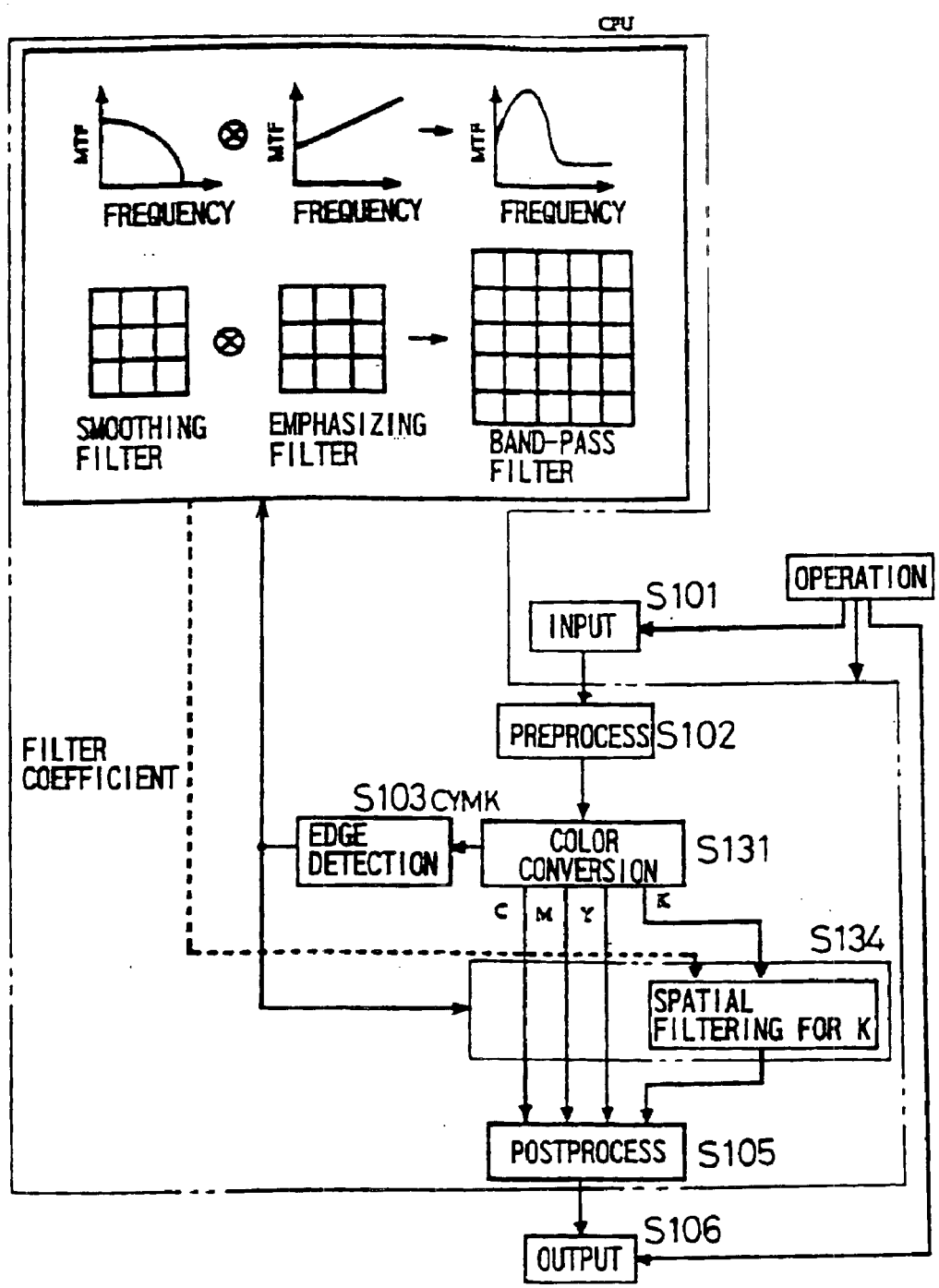
FIG. 40 is a diagram illustrating a process performed by the image forming apparatus of FIG. 26 wherein the CMYK-base image data is processed.

When supplied with the CMYK-base image data, the spatial filter processing section 108 is preferred to perform the spatial filter process only to the black data (K) of the image data. FIG. 40 is a diagram illustrating a process of from image input to image output which is carried out in the image forming apparatus 101 of FIG. 26 wherein the spatial filter processing section 108 processes the CMYK-base image data. After completion of the preprocess at Step S102, the color conversion section 41 in the color correcting section 24 of the image processor 103 performs Step S131 to convert the preprocessed RGB-base image data to CMY-base image data and then the black generation/base-color removal section 42 in the color correcting section 24 of the image processor 103 generates black data on the image so as to generate CMYK-base image data using the CMY-base image data and the black data.

The spatial filter processing section 109 performs Step S134 to perform the spatial filter process only to the black data of the CMYK-base image data, using a spatial filter matrix. The spatial filter matrix used for spatially filtering the black data is obtained by convoluting an emphasizing filter matrix and a smoothing filter matrix, just as described with reference to FIGS. 28–32. Cyan (C) data, magenta (M) data and yellow (Y) data are directly supplied to the halftone output gradation processing section 28 without receiving the spatial filter process.

As described with reference to FIG. 40, the edge-emphasizing spatial filter processing section 108 solely emphasizes a black edge in the image but leaves edges of the other colors in the image unemphasized. The following reason is given for this. Where a character image is subjected to the edge emphasizing process, a black edge of the character image is thought to be effectively sharpened. Where the image to be sharpened contains a color edge, the color edge does not always belong to the character image and may be a part of a contour of an area present in the image. If the edge emphasizing process is applied to the color edge, pixel color data is changed for the sub-image portion subjected to the edge emphasizing process. Therefore, the edge-emphasized portion is differently perceived in color from a portion which is not subjected to the edge emphasizing process or otherwise, suffers color turbidity. The spatial filter processing section 108 of FIG. 40 processes only the black data, leaving the other data unprocessed. Thus, the spatial filter processing section 108 is adapted for an even more effective edge emphasis, offering an edge-emphasized image of further improved quality.

The aforementioned image processor 103 of the second embodiment may be used alone or in combination only with the image input unit 13 or only with the image output unit 15. The image processor 103 of the second embodiment may at least include the spatial filter processing section 108 and the image-area separation processing section 106, and may omit any of the other processing units depending on cases.

The image processors 14, 103 of the first and second embodiments merely exemplify the image processor of the invention and hence, may be implemented in other various forms so long as the principal operations are the same. Particularly, specific operations of the respective processing units of the image processor should not be limited to these embodiments and may be implemented in different manners so long as the same processing results are obtained.

In the image processors 14, 103 of the first and second embodiments, the subject image is not limited to the color image but a monochromatic image may be processed. Where the color image is processed, its image data is not limited to the RGB-base image data, the L*a*b*-base image data and the CMYK-base image data. The image data may only consist of data components necessary for providing a pixel color output on a pixel-by-pixel basis. The image data consisting of the data indicative of the color of each pixel and the black data is not limited to the CMYK-base image data but may be of other composition. The image data consisting of the luminance data and color difference data on each pixel is not limited to the L*a*b*-base image data but may take other data format, such as so-called L*u*v*-base image data or YIQ-base image data.

The image-area separation processing section 25, moire-removing spatial filter processing section 27 and filter control unit 26 of the first embodiment, and the image-area separation processing section 106 and edge-emphasizing spatial filter processing section 108 of the second embodiment may be mounted in a single image processor. In this case, an image processed by such an image processor is further improved in quality because both the moire appearance and the density variation due to erroneous edge extraction are obviated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processor comprising:
   dot-area extraction means for extracting a dot area in an image based on image data of a subject image; and
   moire-removing spatial filter means for performing a process of limiting spatial frequency components of the extracted dot area to an image data portion corresponding to the dot area,
   wherein the moire-removing spatial filter means has a characteristic of attenuating an entirety of the spatial frequency components to be contained in the image and further attenuating or removing a predetermined spatial frequency component of the extracted dot area liable to cause moire appearance.

2. The image processor of claim 1, wherein in the case where the image is composed of pixels and image data thereof is composed of luminance data and color difference data on each of the pixels, the moire-removing spatial filter means processes only the luminance data on each pixel.

3. An image processor comprising:
   dot-area extraction means for extracting a dot area in an image based on image data of a subject image; and
   moire-removing spatial filter means for performing a process of limiting spatial frequency components of the extracted dot area to an image data portion corresponding to the dot area,
   wherein the moire-removing spatial filter means has a characteristic of attenuating an entirety of the spatial frequency components to be contained in the image and further attenuating or removing a predetermined spatial frequency component liable to cause moire appearance, and
   wherein the characteristic of the moire-removing spatial filter means is defined by a matrix given by a convolution operation of a matrix defining a characteristic of a first filter for attenuating or removing the moire causative spatial frequency component and a matrix defining a smoothing filter characteristic, and the smoothing filter characteristic is to smooth the entirety of the spatial frequency components to be contained in the image.

4. The image processor of claim 3, wherein the first filter is a band-cut filter, a spatial frequency characteristic of which presents a minimum value at the moire-causative spatial frequency.

5. The image processor of claim 3, wherein all filter coefficients of the matrix defining the smoothing filter characteristic are of an equal value.

6. The image processor of claim 3, wherein out of all the filter coefficients of the matrix defining the smoothing filter characteristic, a central coefficient of the matrix has a greater value than the other coefficients.

7. The image processor of claim 3, wherein in the case where a plurality of the moire-causative spatial frequencies are previously determined, the matrix defining the first filter characteristic is given a cross convolution operation of matrices respectively defining characteristics of respective filters for attenuating or removing the respective moire-causative spatial frequency components.

8. An image processor, comprising:
   dot area extraction means for extracting a dot area in an image based on image data of a subject image; and
   moire-removing spatial filter means for performing a process of limiting spatial frequency components of the extracted dot area to an image data portion corresponding to the dot area,
   wherein the moire-removing spatial filter means has a characteristic of attenuating an entirety of the spatial frequency components to be contained in the image and further concurrently attenuating or removing a predetermined spatial frequency component liable to cause moire appearance.

9. The image processor of claim 8, wherein in the case where the image is composed of pixels and image data thereof is composed of luminance data and color difference data on each of the pixels, the moire-removing spatial filter means processes only the luminance data on each pixel.

10. An image processor comprising:
    dot-area extraction means for extracting a dot area in an image based on image data of a subject image; and
    moire-removing spatial filter means for performing a process of limiting spatial frequency components of the extracted dot area to an image data portion corresponding to the dot area,
    wherein the moire-removing spatial filter means has a characteristic defined by a third matrix given by a convolution operation of a first matrix and a second matrix,
    and wherein the first matrix is defined by a matrix given by a convolution operation of a plurality of band-cut filter matrices with each other, each band-cut filter matrix defines a characteristic of a band-cut filter having a minimum value at each predetermined spatial frequency liable to cause moire appearance,
    the second matrix defines a smoothing filter characteristic to attenuate and smooth the entirety of the spatial frequency to be contained in the image, and
    all filter coefficients of the matrix defining the smoothing filter characteristic are of an equal value.

11. An image processor comprising:
    dot-area extraction means for extracting a dot area in an image based on image data of a subject image; and
    moire-removing spatial filter means for performing a process of limiting spatial frequency components of the extracted dot area to an image data portion corresponding to the dot area,
    wherein the moire-removing spatial filter means has a characteristic defined by a third matrix given by a convolution operation of a first matrix and a second matrix,
    and wherein the first matrix is defined by a matrix given by a convolution operation of a plurality of band-cut filter matrices with each other, each band-cut filter matrix defines a characteristic of a band-cut filter having a minimum value at each predetermined spatial frequency liable to cause moire appearance, the second matrix defines a smoothing filter characteristic to attenuate and smooth the entirety of the spatial frequency to be contained in the image, and out of all the filter coefficients of the matrix defining the smoothing filter characteristic, a central coefficient of the matrix has a greater value than the other coefficients.

* * * * *